US009003950B2

(12) United States Patent
Headley

(10) Patent No.: US 9,003,950 B2
(45) Date of Patent: Apr. 14, 2015

(54) AIR MOTOR HAVING A PROGRAMMABLE LOGIC CONTROLLER INTERFACE AND A METHOD OF RETROFITTING AN AIR MOTOR

(75) Inventor: Thomas R. Headley, Roanoke, IN (US)

(73) Assignee: Ingersoll-Rand Company, Davidson, NC (US)

( * ) Notice: Subject to any disclaimer, the term of this patent is extended or adjusted under 35 U.S.C. 154(b) by 0 days.

(21) Appl. No.: 14/234,445

(22) PCT Filed: Sep. 9, 2011

(86) PCT No.: PCT/US2011/050979
§ 371 (c)(1),
(2), (4) Date: Jan. 23, 2014

(87) PCT Pub. No.: WO2013/036240
PCT Pub. Date: Mar. 14, 2013

(65) Prior Publication Data
US 2014/0154103 A1    Jun. 5, 2014

(51) Int. Cl.
*F01B 23/08*  (2006.01)
*F04B 39/00*  (2006.01)
(Continued)

(52) U.S. Cl.
CPC ............. *F04B 39/0005* (2013.01); *F16N 13/16* (2013.01); *F01B 17/02* (2013.01); *F01L 21/04* (2013.01); *F04B 9/12* (2013.01); *F04B 9/123* (2013.01)

(58) Field of Classification Search
CPC ........ F04B 39/0005; F04B 9/12; F04B 9/123; F16N 13/16; F01L 21/04; F01B 17/00; F01B 17/02

USPC .................................. 91/286, 313, 314, 344
See application file for complete search history.

(56) References Cited

U.S. PATENT DOCUMENTS

| 1,406,330 A | 2/1922 | Barner |
| 2,745,387 A * | 5/1956 | Dinkelkamp ................... 91/287 |

(Continued)

FOREIGN PATENT DOCUMENTS

| JP | 09053402 A | 2/1997 |
| JP | 10008941 A | 1/1998 |

(Continued)

OTHER PUBLICATIONS

International Preliminary Report on Patentability and Written Opinion for International Application No. PCT/US2011/050979 dated Mar. 12, 2014 (4 pages).

(Continued)

*Primary Examiner* — Dwayne J White
*Assistant Examiner* — Logan Kraft
(74) *Attorney, Agent, or Firm* — Barnes & Thornburg LLP

(57) ABSTRACT

A pump assembly having an air motor includes a valve connected to a motive fluid inlet of the air motor. The valve shifts between a first position, in which a flow of motive fluid is directed into a pilot port, through a two way pilot conduit and into a pilot chamber portion, and a second position, in which the flow of motive fluid is inhibited from flowing into the pilot port through the two way pilot conduit and into the pilot chamber portion, and in which fluid in the pilot chamber portion flows out through the two way pilot conduit and is directed by the valve to exhaust. The valve is connected to a programmable logic controller, so that the valve is shifted between the first position and the second position in response to the programmable logic controller.

18 Claims, 25 Drawing Sheets

(51) Int. Cl.
*F01L 21/04* (2006.01)
*F04B 9/12* (2006.01)
*F04B 9/123* (2006.01)
*F16N 13/16* (2006.01)
*F01B 17/02* (2006.01)

(56) References Cited

U.S. PATENT DOCUMENTS

| | | | |
|---|---|---|---|
| 3,174,409 A | 3/1965 | Hill | |
| 3,282,167 A | 11/1966 | McKenzie | |
| 3,618,468 A | 11/1971 | Gardner | |
| 3,635,125 A | 1/1972 | Rood et al. | |
| 3,837,765 A | 9/1974 | Weise et al. | |
| 3,887,765 A | 6/1975 | Murahse et al. | |
| 3,943,823 A | 3/1976 | Tammy | |
| 3,963,383 A | 6/1976 | Hill | |
| 4,079,660 A | 3/1978 | Ives | |
| 4,104,008 A | 8/1978 | Hoffmann et al. | |
| 4,555,221 A | 11/1985 | Dubois | |
| 4,846,045 A | 7/1989 | Grach et al. | |
| 4,854,832 A | 8/1989 | Gardner et al. | |
| 4,889,033 A | 12/1989 | Onishi | |
| 5,107,678 A | 4/1992 | Jornod et al. | |
| 5,174,731 A | 12/1992 | Korver | |
| 5,207,059 A * | 5/1993 | Schexnayder | 60/465 |
| 5,277,099 A | 1/1994 | Powers | |
| 5,349,895 A | 9/1994 | DiCarlo | |
| 5,363,739 A | 11/1994 | Sydow | |
| 5,366,353 A | 11/1994 | Hand | |
| 5,427,012 A | 6/1995 | Frigon et al. | |
| 5,584,666 A | 12/1996 | Kozumplik et al. | |
| 5,875,865 A * | 3/1999 | Wakahara et al. | 180/248 |
| 6,123,008 A | 9/2000 | Scherer | |
| 6,126,403 A | 10/2000 | Yamada | |
| 6,386,841 B1 | 5/2002 | Probst | |
| 6,722,256 B2 | 4/2004 | Roberts et al. | |
| 7,322,801 B2 | 1/2008 | Li et al. | |
| 2005/0036896 A1* | 2/2005 | Navarro | 417/515 |
| 2005/0123416 A1 | 6/2005 | Smith | |
| 2008/0213105 A1 | 9/2008 | Bauck et al. | |
| 2011/0002793 A1 | 1/2011 | Bauck et al. | |

FOREIGN PATENT DOCUMENTS

| | | |
|---|---|---|
| WO | 8502444 A1 | 6/1985 |
| WO | 2007016081 A2 | 8/2007 |
| WO | 2007016151 A2 | 8/2007 |

OTHER PUBLICATIONS

International Search Report and Written Opinion for International Application No. PCT/US2011/050979 dated Apr. 20, 2012 (8 pages).

* cited by examiner

AIR MOTOR HAVING A PROGRAMMABLE LOGIC CONTROLLER INTERFACE AND A METHOD OF RETROFITTING AN AIR MOTOR

BACKGROUND

The present invention relates to air motors and valves for a piston pump.

SUMMARY

In one embodiment, the invention provides an air motor including a motive fluid inlet that receives a flow of motive fluid, a cylinder, and a piston within the cylinder. The piston divides the cylinder into an upper chamber above the piston and a lower chamber below the piston. A valve chamber includes a pilot chamber portion. A spool valve is shiftable to a first position in response to motive fluid pressurizing the pilot chamber portion, and a second position in response to the pilot chamber portion being at atmospheric pressure. The spool valve includes a reduced diameter section and an enlarged diameter section. The enlarged diameter section is exposed to the pilot chamber portion. A D-valve plate includes a first D-valve port that communicates with the upper chamber, a second D-valve port that communicates with the lower chamber, and a D-valve exhaust port that communicates with atmosphere. A D-valve has a flat surface surrounding a concave surface, and the flat surface is in sliding contact with the D-valve plate and the concave surface facing the D-valve plate. The D-valve is connected via a lost motion interconnection to the reduced diameter section of the spool valve. The D-valve shifts with the spool valve between first and second positions corresponding to the respective first and second positions of the spool valve. The D-valve uncovers the first D-valve port when the D-valve is in the first position to introduce motive fluid into the upper chamber. The concave surface of the D-valve places the second D-valve port in communication with the D-valve exhaust port to place the lower chamber in communication with the atmosphere when the D-valve is in the first position. The D-valve uncovers the second D-valve port when the D-valve is in the second position to introduce motive fluid into the lower chamber, and the concave surface of the D-valve places the first D-valve port in communication with the D-valve exhaust port to place the upper chamber in communication with the atmosphere when the D-valve is in the second position. A pilot port is fluidly connected to the pilot chamber portion by a two-way pilot conduit, and a valve is connected to the pilot port. The valve shifts between a first position, in which a flow of motive fluid is directed into the pilot port, through the two-way pilot conduit and into the pilot chamber portion, and a second position, in which the flow of motive fluid is inhibited from flowing into the pilot port through the two-way pilot conduit and into the pilot chamber portion and in which fluid in the pilot chamber portion flows out through the two way pilot conduit and is directed by the valve to exhaust. The valve is connected to a programmable logic controller that actuates the valve between the first position and the second position. An output rod is interconnected for reciprocal movement with the piston and adapted to perform work.

In some embodiments, the invention provides a pump assembly including a motive fluid inlet that receives a flow of motive fluid, an air motor including a motive fluid inlet that receives a flow of motive fluid, a cylinder, and a piston within the cylinder. The piston divides the cylinder into an upper chamber above the piston and a lower chamber below the piston. A valve chamber includes a pilot chamber portion. A spool valve is shiftable to a first position in response to motive fluid pressurizing the pilot chamber portion, and a second position in response to the pilot chamber portion being at atmospheric pressure. The spool valve includes a reduced diameter section and an enlarged diameter section. The enlarged diameter section is exposed to the pilot chamber portion. A D-valve plate includes a first D-valve port that communicates with the upper chamber, a second D-valve port that communicates with the lower chamber, and a D-valve exhaust port that communicates with atmosphere. A D-valve has a flat surface surrounding a concave surface, and the flat surface is in sliding contact with the D-valve plate and the concave surface facing the D-valve plate. The D-valve is connected via a lost motion interconnection to the reduced diameter section of the spool valve. The D-valve shifts with the spool valve between first and second positions corresponding to the respective first and second positions of the spool valve. The D-valve uncovers the first D-valve port when the D-valve is in the first position to introduce motive fluid into the upper chamber. The concave surface of the D-valve places the second D-valve port in communication with the D-valve exhaust port to place the lower chamber in communication with the atmosphere when the D-valve is in the first position. The D-valve uncovers the second D-valve port when the D-valve is in the second position to introduce motive fluid into the lower chamber, and the concave surface of the D-valve places the first D-valve port in communication with the D-valve exhaust port to place the upper chamber in communication with the atmosphere when the D-valve is in the second position. A pilot port is fluidly connected to the pilot chamber portion by a two-way pilot conduit, and a valve is connected to the pilot port. The valve shifts between a first position, in which a flow of motive fluid is directed into the pilot port, through the two-way pilot conduit and into the pilot chamber portion, and a second position, in which the flow of motive fluid is inhibited from flowing into the pilot port through the two-way pilot conduit and into the pilot chamber portion and in which fluid in the pilot chamber portion flows out through the two way pilot conduit and is directed by the valve to exhaust. The valve is connected to a programmable logic controller that actuates the valve between the first position and the second position. An output rod is interconnected for reciprocal movement with the piston and adapted to perform work.

In some embodiments, the invention provides a method of retrofitting a mechanically-actuated air motor. The method includes providing an air motor having a motive fluid inlet that receives a flow of motive fluid, a cylinder, and a piston within the cylinder. The piston divides the cylinder into an upper chamber above the piston and a lower chamber below the piston. A valve chamber includes a pilot chamber portion. A spool valve is shiftable to a first position in response to motive fluid pressurizing the pilot chamber portion, and a second position in response to the pilot chamber portion being at atmospheric pressure. The spool valve includes a reduced diameter section and an enlarged diameter section. The enlarged diameter section is exposed to the pilot chamber portion. A D-valve plate includes a first D-valve port that communicates with the upper chamber, a second D-valve port that communicates with the lower chamber, and a D-valve exhaust port that communicates with atmosphere. A D-valve has a flat surface surrounding a concave surface, and the flat surface is in sliding contact with the D-valve plate and the concave surface facing the D-valve plate. The D-valve is connected via a lost motion interconnection to the reduced diameter section of the spool valve. The D-valve shifts with the spool valve between first and second positions corresponding to the respective first and second positions of the spool valve. The D-valve uncovers the first D-valve port when the D-valve is in the first position to introduce motive fluid into the upper chamber. The concave surface of the D-valve places the second D-valve port in communication with the D-valve exhaust port to place the lower chamber in communication with the atmosphere when the D-valve is in the first position. The D-valve uncovers the second D-valve port when the D-valve is in the second position to introduce motive fluid into the lower chamber, and the concave surface of the D-valve places the first D-valve port in communication with the D-valve exhaust port to place the upper chamber in communication with the atmosphere when the D-valve is in the second position. A pilot port is fluidly connected to the pilot chamber portion by a two-way pilot conduit, and a valve is connected to the pilot port. The valve shifts between a first position, in which a flow of motive fluid is directed into the pilot port, through the two-way pilot conduit and into the pilot chamber portion, and a second position, in which the flow of motive fluid is inhibited from flowing into the pilot port through the two-way pilot conduit and into the pilot chamber portion and in which fluid in the pilot chamber portion flows out through the two way pilot conduit and is directed by the valve to exhaust. The valve is connected to a programmable logic controller that actuates the valve between the first position and the second position. An output rod is interconnected for reciprocal movement with the piston and adapted to perform work. The method further includes removing a pilot cover from a valve housing, removing a pilot valve plate having a first pilot port that communicates with the pilot chamber portion and a second pilot port that communicates with atmosphere, blocking an opening between the pilot port and a pilot exhaust conduit, re-connecting the pilot cover to the valve housing, removing a pipe plug from a pilot port on the valve housing, inserting a conduit into the pilot port, coupling a valve to the conduit, fluidly connecting the valve to a source of motive fluid, and controlling reciprocation of the piston with the valve.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
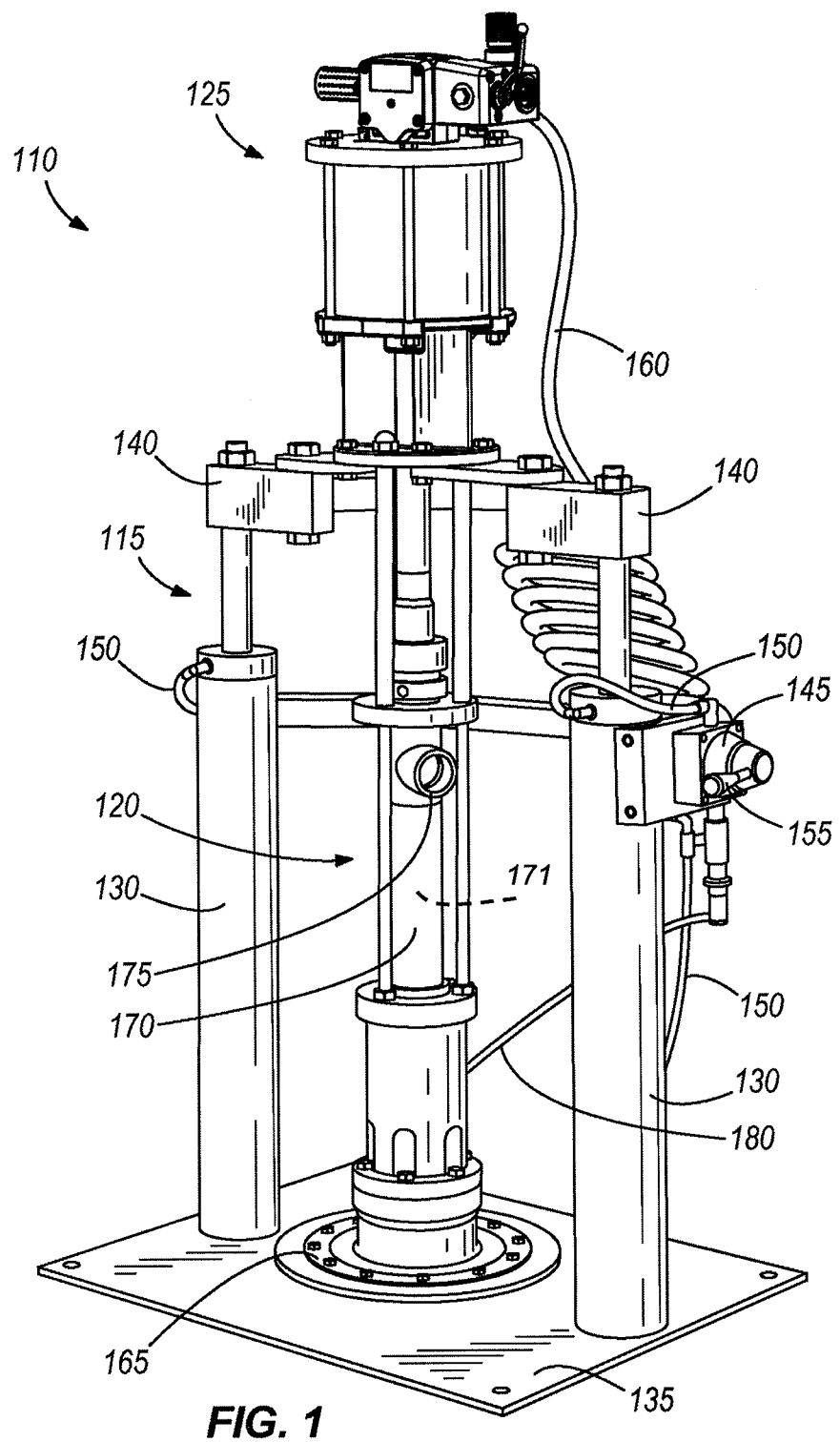
FIG. 1 is a perspective view of a piston pump according to some embodiments of the present invention.

FIG. 1 illustrates a piston pump assembly 110 according to one embodiment of the present invention. The piston pump assembly 110 includes a stand 115, a piston pump 120, and an air motor 125. The stand 115 includes first and second rams 130 and a base plate 135. The air motor 125 and piston pump 120 are mounted to support blocks 140 at the top of each of the rams 130. The air motor 125 is above the support blocks 140 and the piston pump 120 is below the support blocks 140, directly beneath the air motor 125.

A supply of motive fluid 145 communicates with the top and bottom end of each of the first and second rams 130 via ram hoses 150. In this disclosure, the term "motive fluid" means any fluid that is used to perform work. Motive fluid includes but is not limited to compressed air. A control handle 155 on the supply of motive fluid 145 is used to direct motive fluid to either the bottom end of the rams 130 or the top end of the rams 130, to respectively raise and lower the air motor 125 and piston pump 120 with respect to the base plate 135. Motive fluid is provided to the air motor 125 from the supply of motive fluid 145 via a motor hose 160. The air motor 125 operates under the influence of the motive fluid to operate the piston pump 120.

The piston pump 120 includes a wiper assembly 165, a pump cylinder 170, and an outlet 175. In operation, the rams 130 are raised such that the wiper assembly 165 is lifted a sufficient distance off the base plate 135 to accommodate a container of fluid to be pumped. The wiper assembly 165 is sized to fit within the container of fluid (e.g., a 5-gallon bucket, a barrel, or other container). When it is time to pump the fluid out of the container, the rams 130 are permitted to lower under the influence of gravity or are actively lowered by motive fluid being supplied to the tops of the rams 130. As the rams 130 are lowered, the wiper assembly 165 is pushed down into the container, with the wiper 165 pushing down on the fluid to be pumped. This feeds the fluid to be pumped into the pump cylinder 170.

At the same time as the rams 130 are lowered, motive fluid is supplied to the air motor 125 and the air motor 125 drives operation (i.e., reciprocation) of the piston pump 120. Within the pump cylinder 170, one or more one-way valve(s) 171 reciprocate under the influence of the air motor 125 to force fluid up to the outlet 175. From the outlet 175, the fluid to be pumped is directed by hoses or other conduits to a desired destination. Once the wiper 165 has bottomed out in the container, or it is otherwise desired to raise the wiper 165 out of the container, the supply of motive fluid 145 provides motive fluid into the container under the wiper 165 by way of a hose 180. This supply of motive fluid to the container permits the wiper 165 to be extracted from the container without creating a vacuum in the container that might lift the container.

Figure 2:
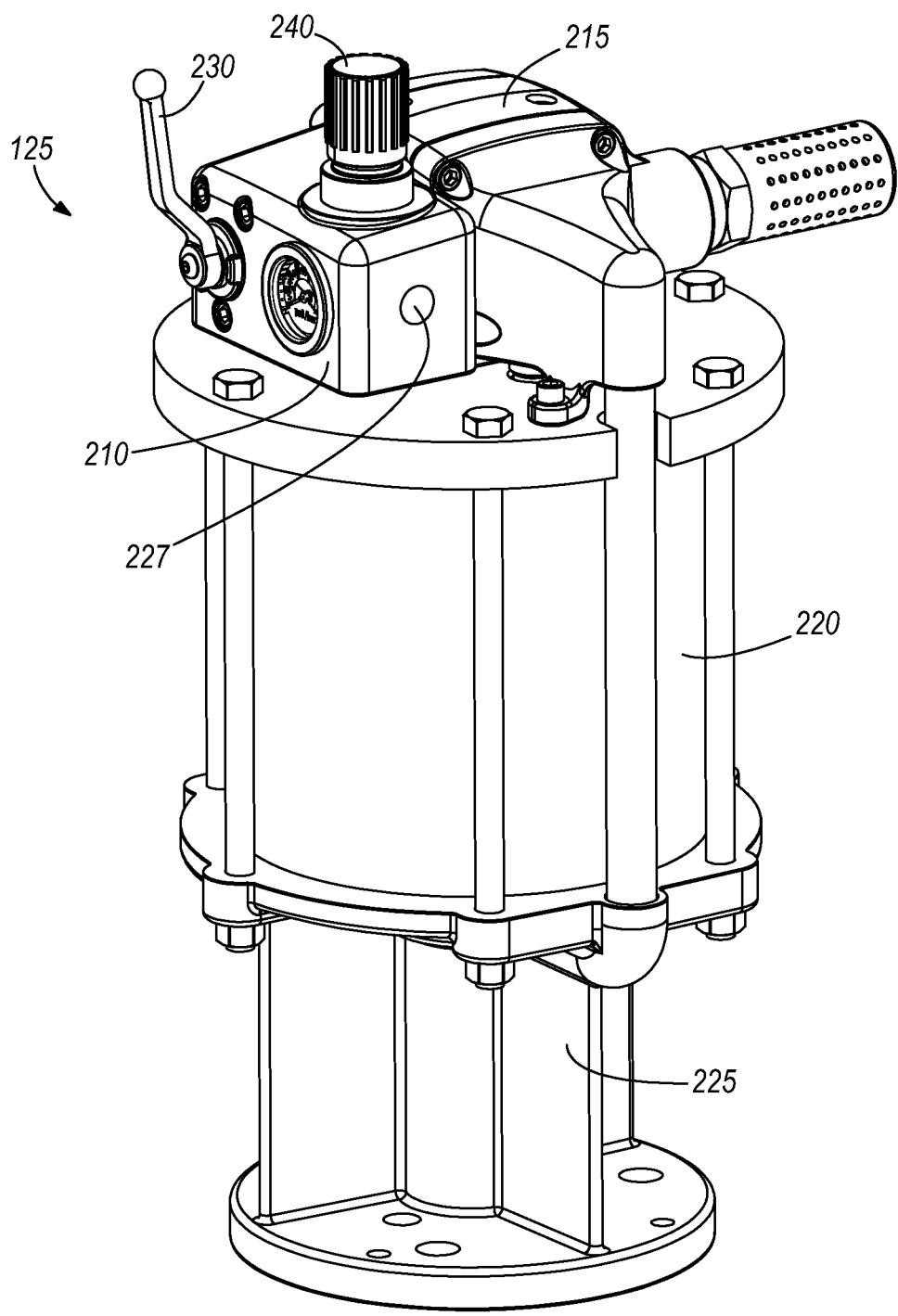
FIG. 2 is a perspective view of an air motor of the piston pump of FIG. 1.
Figure 3:
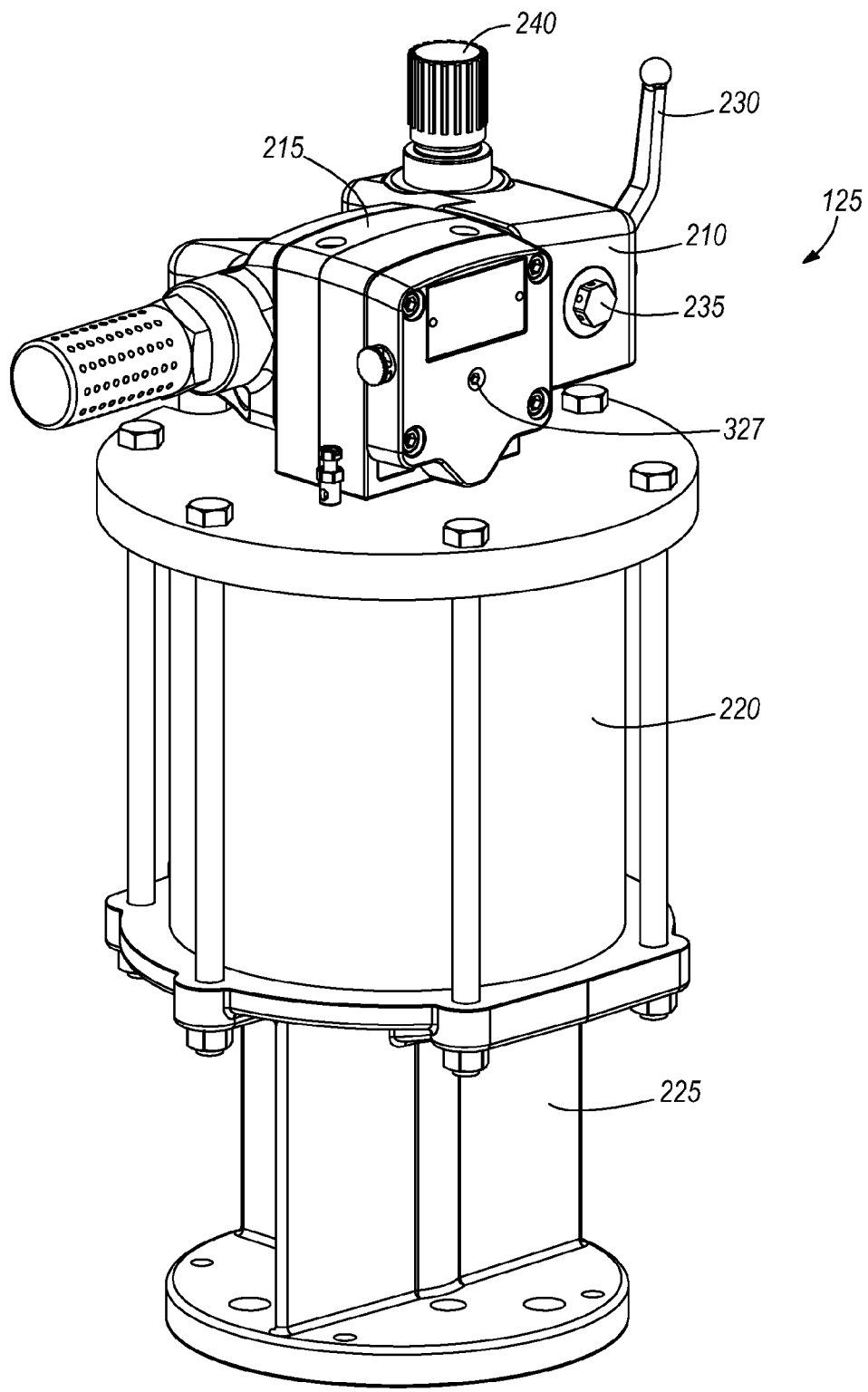
FIG. 3 is a reverse perspective view of the air motor of FIG. 2.

FIGS. 2 and 3 illustrate the air motor 125, which includes a pressure regulator assembly 210, a valve block assembly 215, a cylinder assembly 220, and a lower end assembly 225. The pressure regulator assembly 210 provides a connection point 227 for the motor hose 160 that supplies motive fluid to the air motor 125. The pressure regulator assembly 210 includes a handle 230 which has an on position, an off position, and a bleed position. In the on position, motive fluid is supplied to the air motor 125 and in the off position, motive fluid is not provide to the air motor 125. In the bleed position, operation of the air motor 125 is shut down and motive fluid is permitted to bleed out of the air motor 125 through a bleed valve 235. The pressure regulator 210 also includes a pressure adjustment handle 240, which can be rotated one way or the other to increase or decrease the pressure of motive fluid supplied to the air motor 125.

Figure 4:
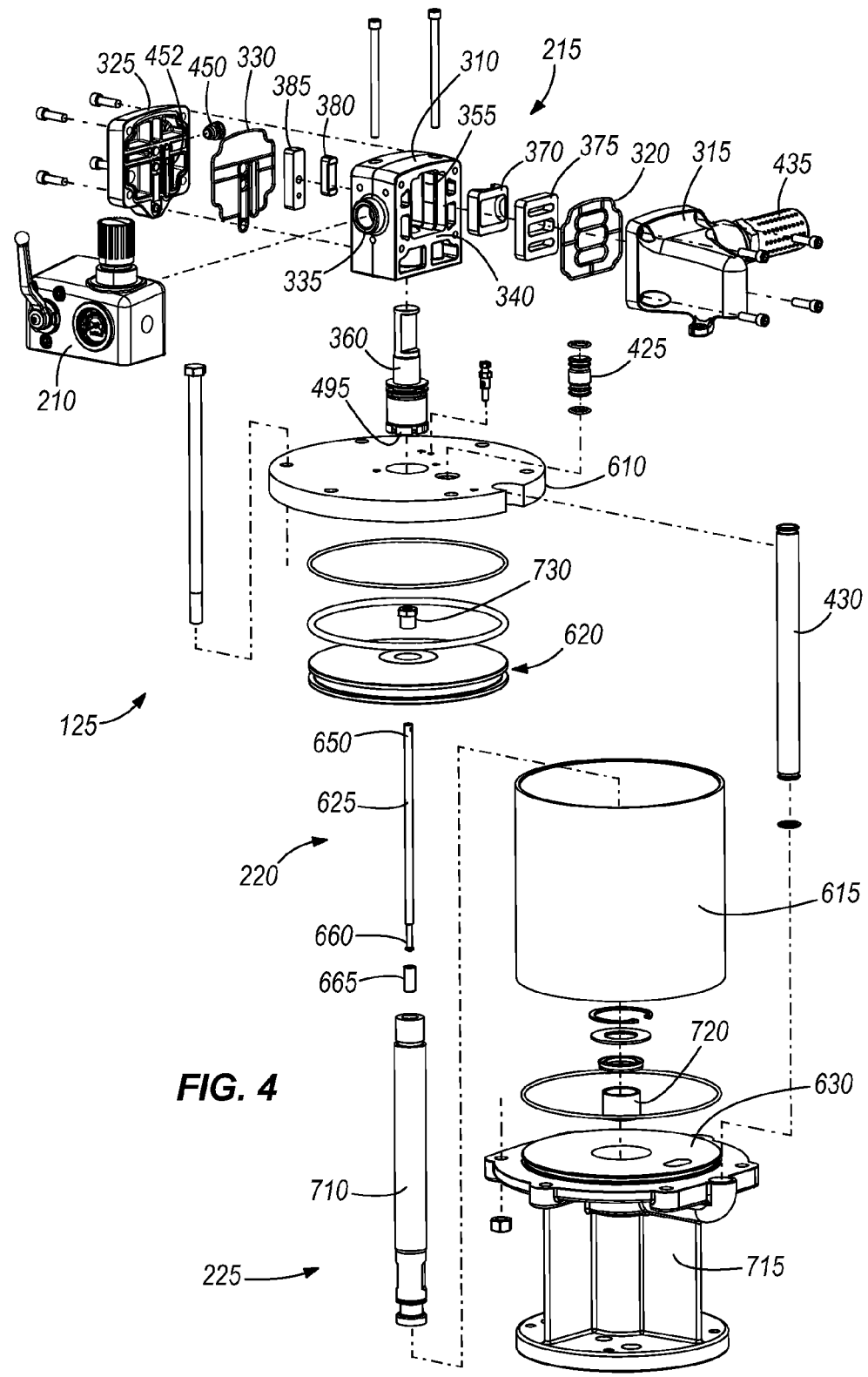
FIG. 4 is an exploded view of the air motor.
Figure 5:
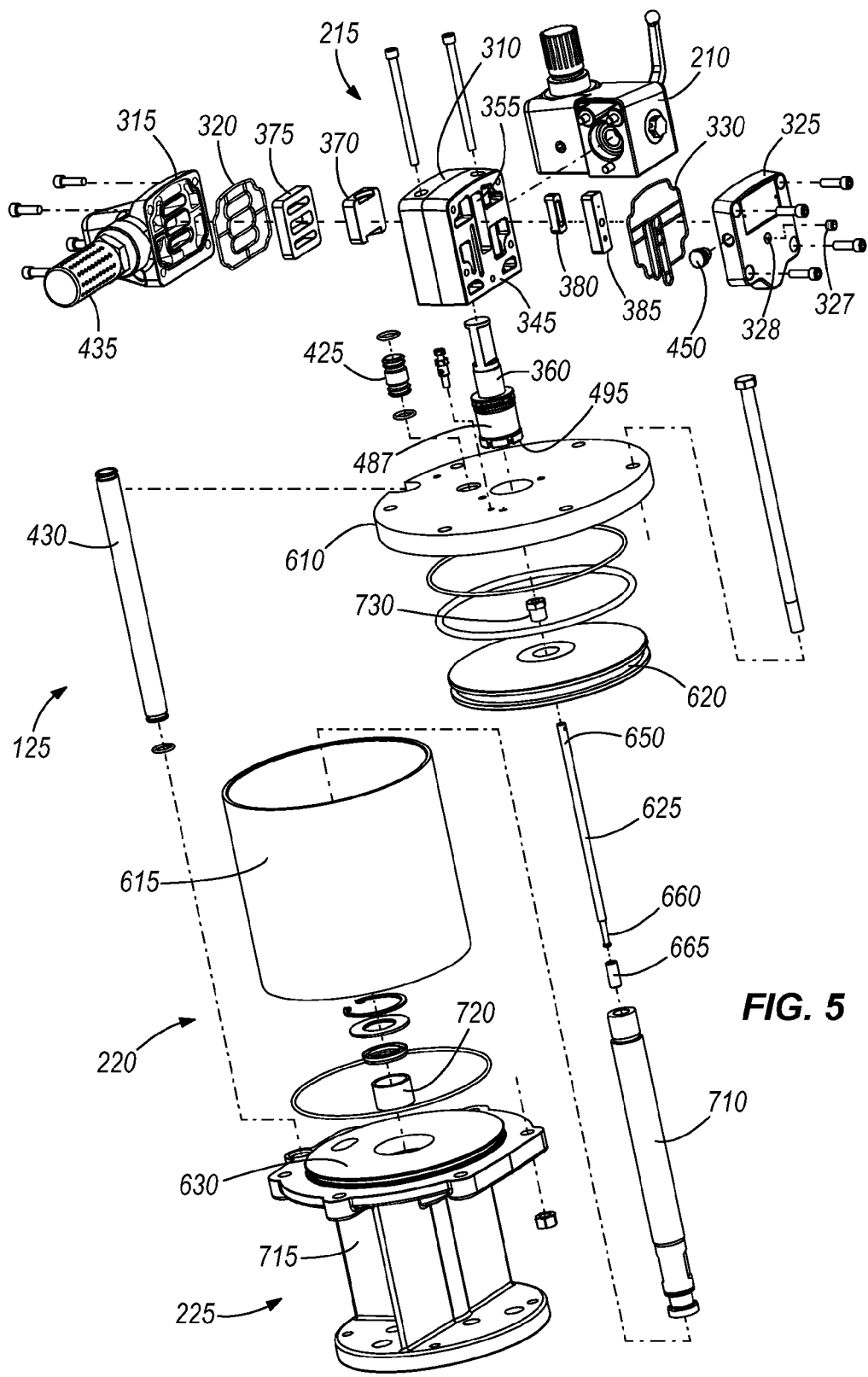
FIG. 5 is a reverse exploded view of the air motor.

With reference to FIGS. 4 and 5, the valve block assembly 215 includes a valve housing 310, a manifold cover 315, a manifold gasket 320, a pilot cover 325, a pipe plug 327, a pilot port 328, and a pilot gasket 330. The valve housing 310 includes a motive fluid inlet 335, a manifold side 340, and a pilot side 345. The motive fluid inlet 335 communicates with the pressure regulator 210 to receive motive fluid for operation of the air motor 125. The manifold cover 315 and the manifold gasket 320 are mounted to the manifold side 340 of the valve housing 310, and the pilot cover 325 and the pilot gasket 330 are mounted to the pilot side 345 of the valve housing 310.

A valve chamber 355 is defined within the valve housing 310 between the manifold cover 315 and the pilot cover 325. Within the valve chamber 355 is a valve assembly, which includes a spool valve 360, a D-valve 370, a D-valve plate 375, a pilot valve 380, and a pilot valve plate 385. The spool valve 360 actually an assembly of parts, some of which will be described in more detail below. The spool valve 360 is generally centered within the valve chamber 355. The D-valve 370 and D-valve plate 375 are on the manifold side 340 of the valve housing 310, and the pilot valve 380 and pilot valve plate 385 are on the pilot side 345 of the valve housing 310.

Turning now to FIGS. 6-9, the manifold cover 315 defines an upper chamber port 410, a lower chamber port 415, and a manifold exhaust port 420. A short drop tube 425 is received within the upper chamber port 410, a long drop tube 430 is received within the lower chamber port 415, and a muffler 435 (FIGS. 4 and 5) is received within the manifold exhaust port 420. Each of the short drop tube 425, long drop tube 430, and muffler 435 may include an o-ring seal for creating an airtight seal between the ports and the tubes or muffler received in the ports. The pilot cover 325 defines a two-way pilot conduit 440 and a pilot exhaust conduit 445. A vent plug 450 (FIGS. 4 and 5) is received within the pilot exhaust conduit 445. The pilot cover 325 further includes a dedicated exhaust conduit 452 that communicates with the pilot exhaust conduit 445.

The D-valve plate 375 includes a first D-valve port 455, a second D-valve port 460, and a D-valve exhaust port 465 between the first and second ports 455, 460. The first D-valve port 455, second D-valve port 460, and D-valve exhaust port 465 of the D-valve plate 375 register with the upper chamber port 410, lower chamber port 415, and the manifold exhaust port 420, respectively, in the manifold cover 315. The pilot valve plate 385 includes a first pilot port 470 and a second pilot port 475. The two-way pilot conduit 440 and pilot exhaust conduit 445 register with the first pilot port 470 and second pilot port 475, respectively.

The spool valve 360 includes an upper portion with a reduced-diameter section 480, a lower portion with an enlarged-diameter section 485, and a cup or cylinder 487 in which the enlarged-diameter section 485 reciprocates. The enlarged-diameter section 485 includes a blind bore 490. A cover or washer 495 secured across the opening of the blind bore 490 and held in place with a snap ring. A cup seal 510 on the outside of the enlarged-diameter section 485 creates a seal between the spool valve 360 and the valve housing 310. The portion of the valve chamber 355 below the cup seal 510 and outside of the cylinder 487 defines a pilot chamber 515 Immediately below the cup seal 510 is a vent bushing 517 which communicates between the inside of the cylinder 487 and the dedicated exhaust conduit 452. As a result, the inside of the cylinder 487 is constantly in communication with atmosphere through the vent bushing, dedicated exhaust conduit 452, and pilot exhaust conduit 445. This accommodates displaced and sucked in air above the head of the enlarged diameter section 485 during reciprocating movement of the spool valve 360. The two-way pilot conduit 440 communicates with the pilot chamber 515 below the spool seal 518.

The D-valve 370 and pilot valve 380 are captured within a the reduced-diameter section 480 of the spool valve 360. As a result, the D-valve 370 and pilot valve 380 are coupled for reciprocation with the spool valve 360. The D-valve 370 includes a flat surface which abuts against and slides with respect to the D-valve plate 375. The D-valve 370 includes an arcuate, concave surface 520 that opens toward the D-valve plate 375. The flat surface of the D-valve surrounds the concave surface 520. The D-valve includes cut-outs 525 at the top and bottom which cause lost motion between the D-valve and the spool valve 360. The pilot valve 380 fits tightly within the reduced-diameter section 480 of the spool valve 360 so there is no lost motion. The pilot valve 380 includes an concave surface 530 that faces the pilot valve plate 385, and the pilot valve 380 includes a flat surface that surrounds the concave surface 530 and slides against the pilot valve plate 385.

Referring again to FIGS. 4 and 5, the cylinder assembly 220 includes a top plate 610, cylinder 615, a piston 620, an actuation rod 625, and a bottom plate 630. As shown in FIGS. 10-13, the space within the cylinder 615 between the top plate 610 and the piston 620 defines an upper chamber 635, and the space within the cylinder 615 between the bottom plate 630 and the piston 620 defines a lower chamber 640. The top plate 610 includes a top plate port 648 which receives the lower end of the short drop tube 425. The top plate port 648 places the upper chamber port 410 and short drop tube 425 in fluid communication with the upper chamber 635. The actuation rod 625 includes a first end 650 to which a cap 655 (FIG. 6) is pinned and a second opposite end 660 to which an open running clearance sleeve 665 is attached.

With continued reference to FIGS. 4 and 5, the lower end assembly 225 includes an output rod or output shaft 710 and a base 715 on which the cylinder assembly 220 sits. The output shaft 710 is threaded into a central hole in the piston 620. The output shaft 710 also includes a lower end that extends into a through bore in the base 715. The lower end provides an attachment point for the piston pump assembly 110. The lower end assembly 225 also includes a bushing 720 in the base 715, to facilitate longitudinal reciprocation of the output shaft 710. As seen in FIGS. 10-13, the output shaft 710 includes a blind bore 725. An open running clearance bushing 730 is fit within the upper end of the output shaft 710.

As illustrated in FIGS. 6-9, the first end 650 of the actuation rod 625 extends through the washer 495 in the enlarged-diameter section 485 of the spool valve 360, and is captured within the enlarged-diameter section 485 on account of the cap 655 being pinned to the first end 650. As illustrated in FIGS. 10-13, the second end 660 and sleeve 665 are received within the bore 725 of the output shaft 710, and are captured within the bore 725 by the open running clearance bushing 730.

The base 715 includes a base port 810 into which the lower end of the long drop tube 430 is received. The base port 810 places the lower chamber port 415 and long drop tube 430 in fluid communication with the lower chamber 640.

Figure 6:
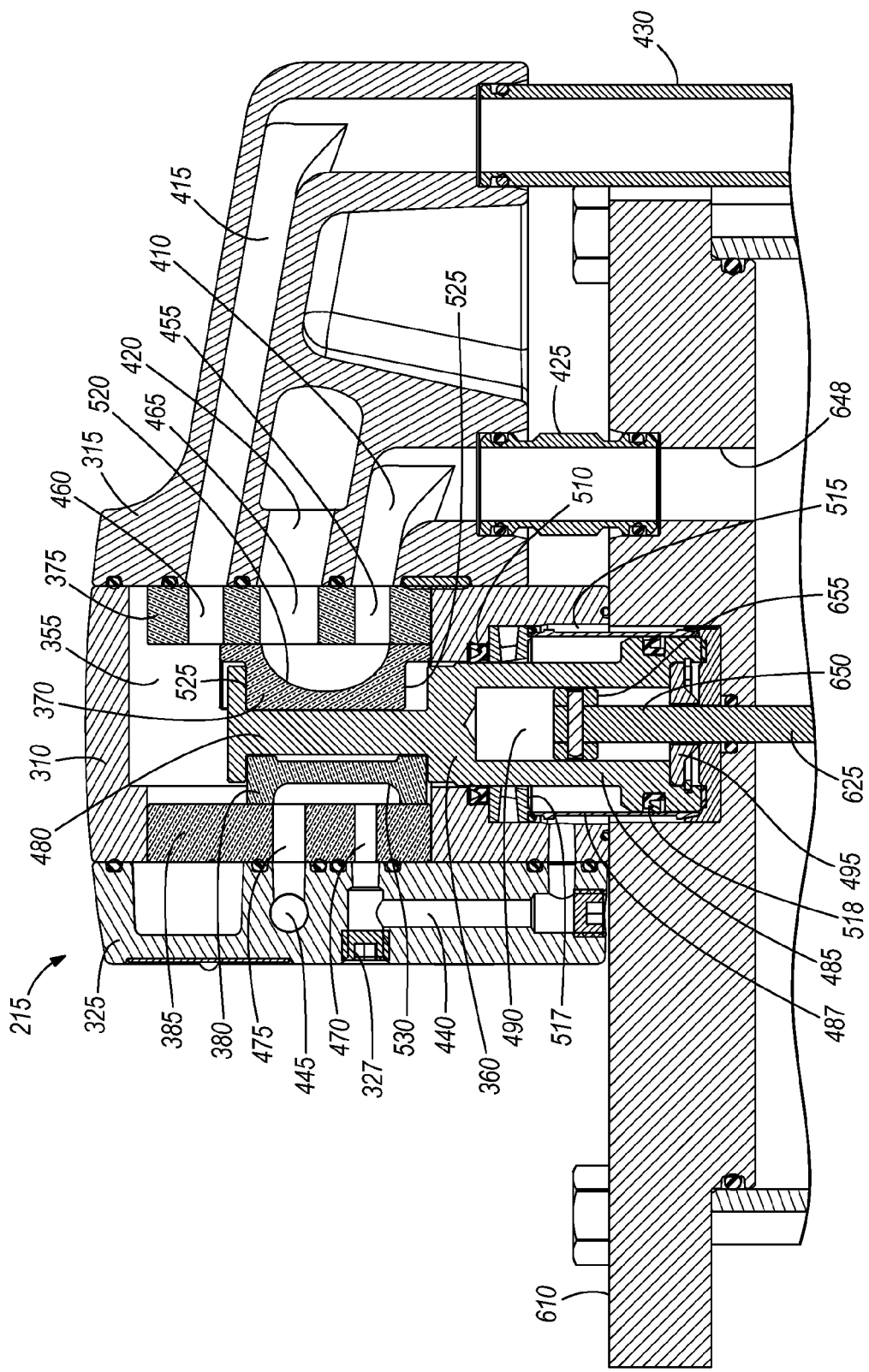
FIG. 6 is a cross-sectional view of the top end of the air motor, with the spool valve in a first position.

A cycle of operation of the valve assembly will now be described with reference to FIGS. 6-9. In FIG. 6, the spool valve 360 is in the fully-down position. The first end 650 of the actuation rod 625 is in between the top of the blind bore 490 and the washer 495 in the spool valve 360. The pilot valve 380 places the pilot chamber 515 in fluid communication with the pilot exhaust conduit 445, such that the pilot chamber 515 is at or near atmospheric pressure. The valve chamber 355 above the spool valve 360 is at the elevated pressure of the motive fluid.

The D-valve is pushed down by motive fluid pressure in the valve chamber 355 acting on the spool valve 360. The upper chamber 635 is vented to atmosphere through the top plate port 648, the short drop tube 425, the upper chamber port 410, the first D-valve port 455, the concave surface 520 of the D-valve 370, the D-valve exhaust port 465, the manifold exhaust port 420, and the muffler 435. At the same time, the D-valve has uncovered the second D-valve port 460, such that motive fluid flows out of the valve chamber 355, through the second D-valve port 460, through the lower chamber port 415, through the long drop tube 430, through the base port 810, and into the lower chamber 640. As a result of this valve positioning, the piston 620 rises, which causes the actuation rod 625 to rise, once a bottom end of the bore 725 contacts the second end 660 of the actuation rod 625.

Figure 7:
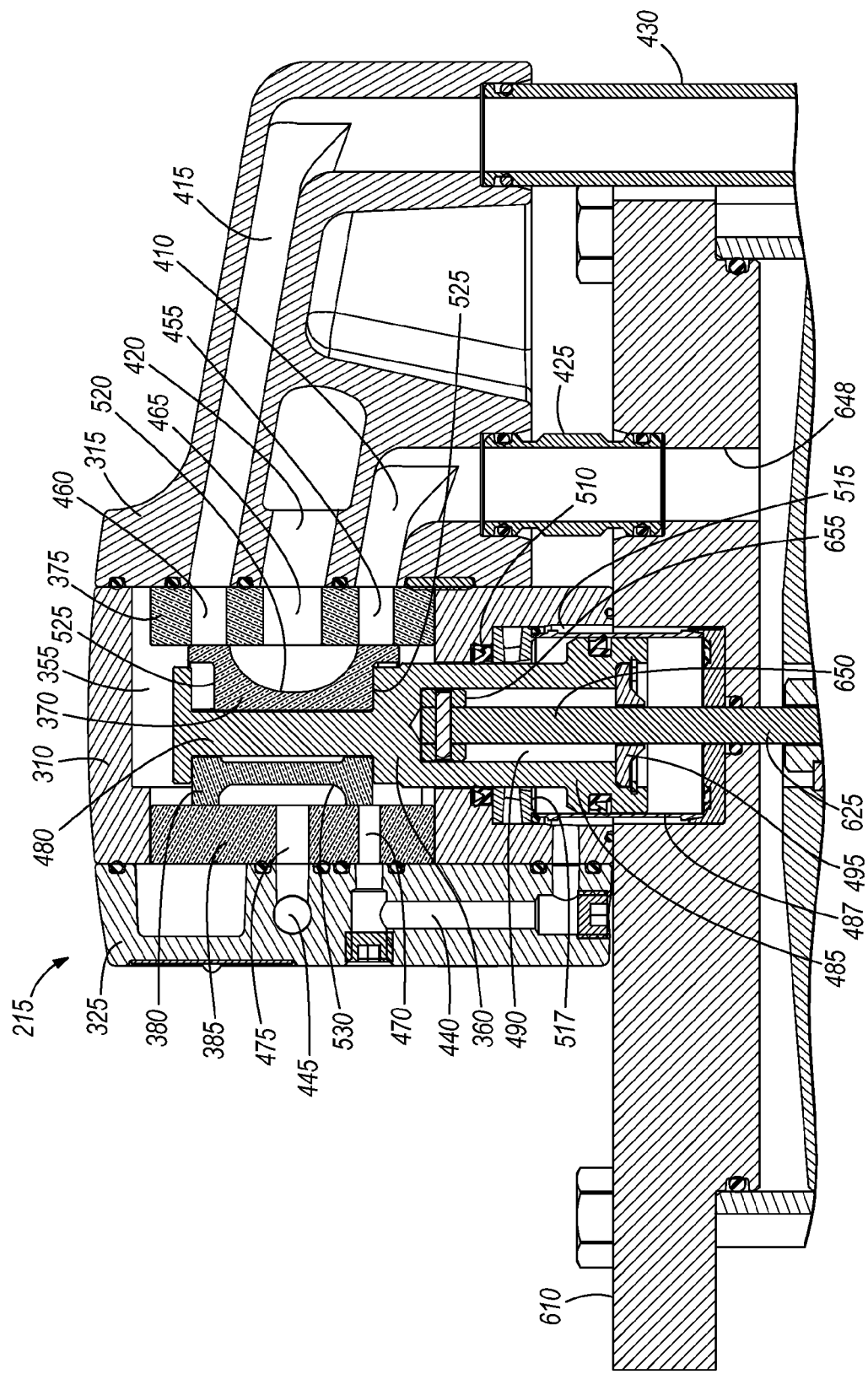
FIG. 7 is a cross-sectional view of the top end of the air motor, within the spool valve in a second position.

FIG. 7 illustrates the actuation rod 625 having risen sufficiently to overcome the lost motion associated with the top of the actuation rod 625 topping out within the blind bore 490 in the enlarged-diameter section 485 of the spool valve 360. The actuation rod 625 has also risen sufficiently to push the spool valve 360 up to a point at which the pilot valve 380 starts to uncover the first pilot port 470. Also, upward movement of the spool valve 360 has covered the lost motion associated with the D-valve 370, as the spool valve 360 has abutted the cutout surface 525 and started to move the D-valve 370 up. The flat surface of the D-valve 370 at this point covers both the first D-valve port 455 and the second D-valve port 460, so the valve chamber 355 is cut off from communication with both the upper and lower chambers 635, 640. Because the first pilot port 470 is partially uncovered by the pilot valve 380, motive fluid rushes to the pilot chamber 515 through the first pilot port 470 and the two-way pilot conduit 440. With the exception of the volume between the seal 518 and the cup seal 510 with atmosphere through the vent bushing 517, the entire valve chamber 355 (both above the spool valve 360 and below the spool valve 360 in the pilot chamber 515) is at the pressure of the motive fluid.

Figure 8:
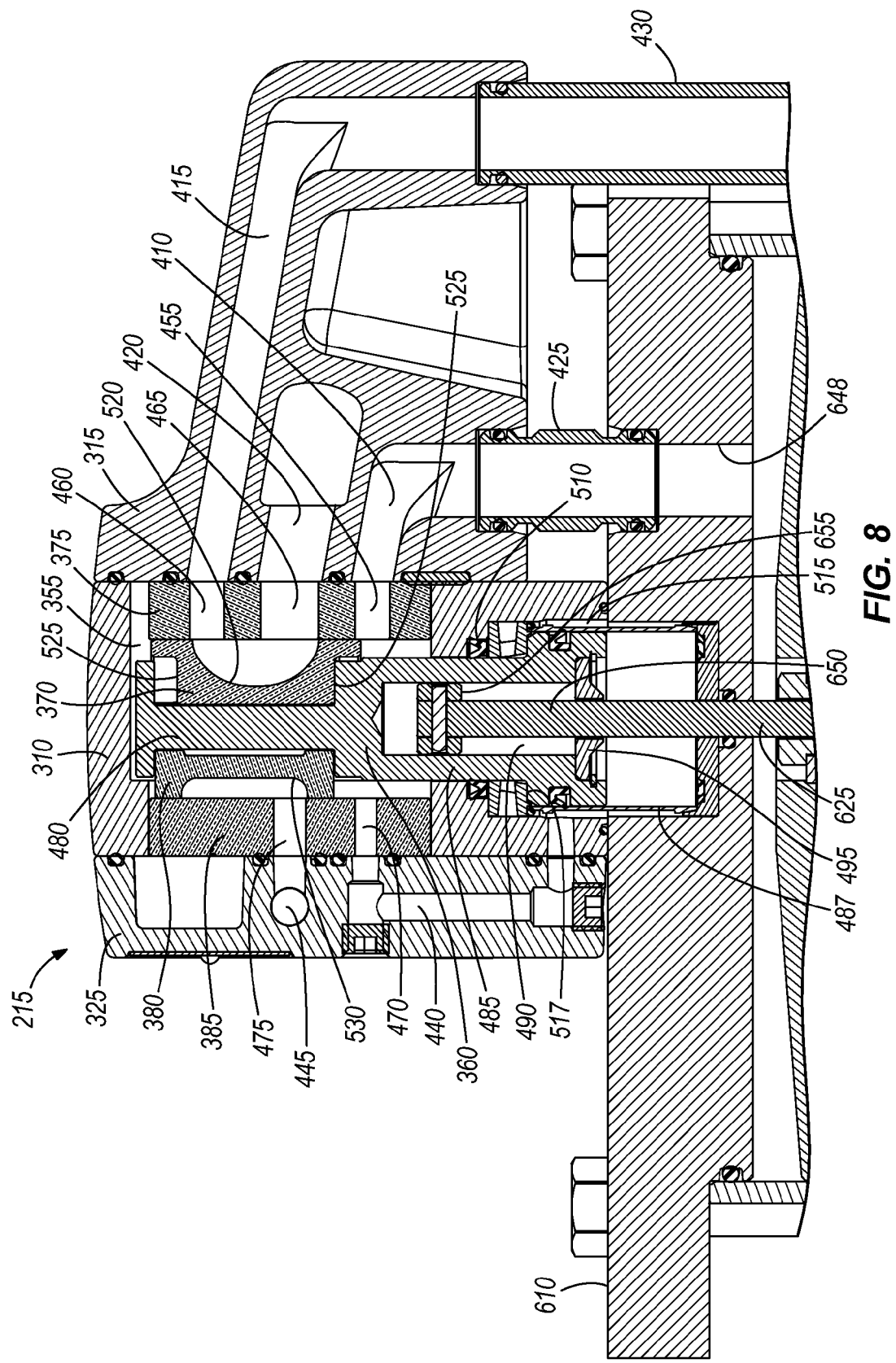
FIG. 8 is a cross-sectional view of the top end of the air motor, within the spool valve in a third position.

In FIG. 8, the spool valve 360 is topped out within the valve chamber 355. The top of the spool valve 360 has a smaller surface area than the bottom of the spool valve 360. Because the top and bottom are exposed to the same pressure, the resultant force on the bottom of the spool valve 360 is greater than the resultant force on the top of the spool valve 360. Consequently, the spool valve 360 moves up under the influence of the force difference, without the aid of the actuation rod 625. The first end 650 of the actuation rod 625 is in between the top of the blind bore 490 and the washer 495 in the spool valve 360.

The pilot valve covers the second pilot port 475 and pilot exhaust conduit 445. The lower chamber 640 is vented to atmosphere through the base port 810, the long drop tube 430, the lower chamber port 415, the second D-valve port 460, the concave surface 520 of the D-valve 370, the D-valve exhaust port 465, the manifold exhaust port 420, and the muffler 435. At the same time, the D-valve has uncovered the first D-valve port 455, such that motive fluid flows out of the valve chamber 355, through the first D-valve port 455, through the upper chamber port 410, through the short drop tube 425, through the top plate port 648, and into the upper chamber 635. As a result of this valve positioning, the piston 620 lowers, which causes the actuation rod 625 to lower.

Figure 9:
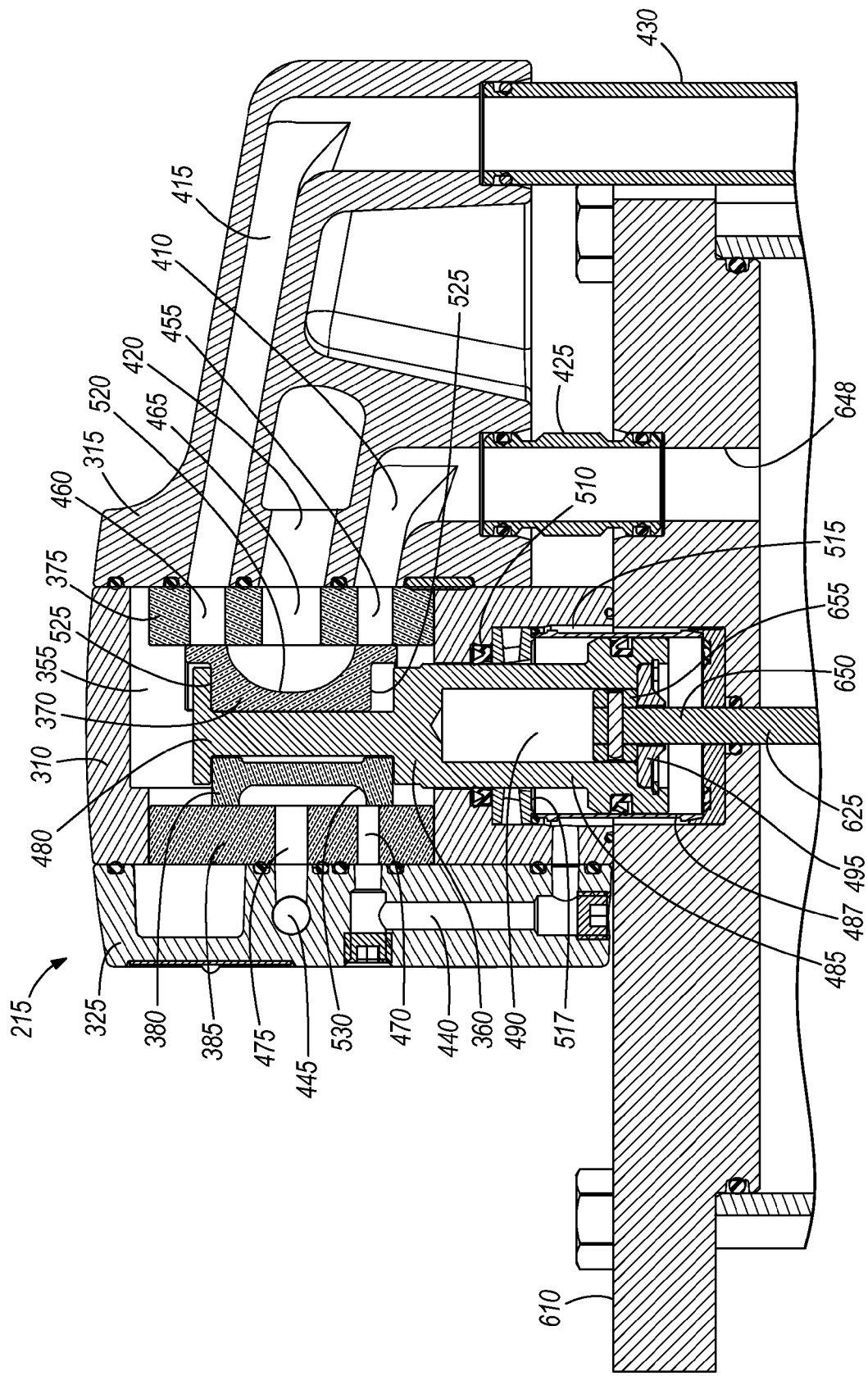
FIG. 9 is a cross-sectional view of the top end of the air motor, within the spool valve in a fourth position.

FIG. 9 illustrates a valve positioning in which the actuation rod 625 has overcome the lost motion portion of the spool valve 360 (i.e., the cap 655 has bottomed out on the washer 495), and the spool valve 360 has overcome the lost motion portion of the D-valve 370 (i.e., the top of the spool valve 360 has abutted the top cut-out 525 of the D-valve 370). The spool valve 360 has moved down sufficiently to place the first pilot port 470 in communication with the second pilot port 475 via the pilot valve 380. As a result, motive fluid flows out of the pilot chamber 515 through the two-way pilot conduit 440, the first pilot port 470, the pilot valve 380, the second pilot port 475, the pilot exhaust conduit 445, and the vent plug 450. The pilot chamber 515 is therefore at atmospheric pressure. The flat surface of the D-valve 370 at this point covers both the first D-valve port 455 and the second D-valve port 460, so the valve chamber 355 is cut off from communication with both the upper and lower chambers 635, 640.

The portion of the valve chamber 355 above the spool valve 360 is at motive fluid pressure, and the portion of the valve chamber 355 below the spool valve 360 (i.e., the pilot chamber 515) is at atmospheric pressure. As a result, the spool valve 360 is pushed down from the position in FIG. 9 to the position in FIG. 6. The D-valve 370 is moved down by the spool valve 360, which places the lower chamber 640 in communication with motive fluid and places the upper chamber 635 in communication with atmosphere, as discussed above. At this point, a cycle of operation is complete.

Figure 10:
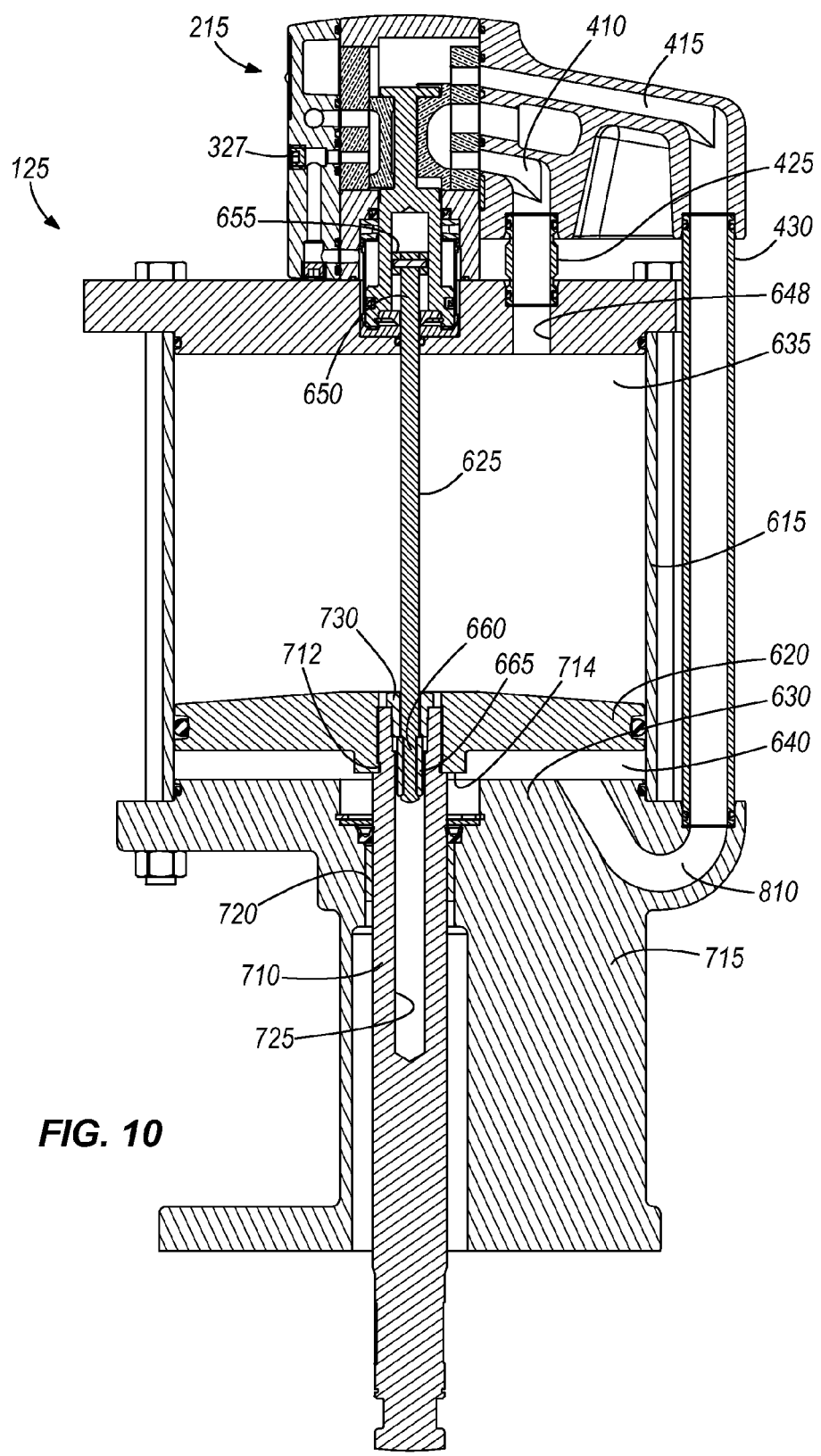
FIG. 10 is a cross-sectional view of the air motor in a first position in the operational cycle.

FIGS. 10-15 illustrate a full cycle of operation of the cylinder assembly 220 and lower end assembly 225 of the air motor 125. In FIG. 10, the piston 620 is in the fully down position, with the spool valve 360 having just shifted to its fully-down position (i.e., the position illustrated and described above with respect to FIG. 6). The sleeve 665 on the second end 660 of the actuation rod 625 is topped out within the bore 725 of the output shaft 710, against the bushing 730. Motive fluid floods into the lower chamber 640 owing to the valve positioning described above with respect to FIG. 6, and the piston 620 starts to rise.

Figure 11:
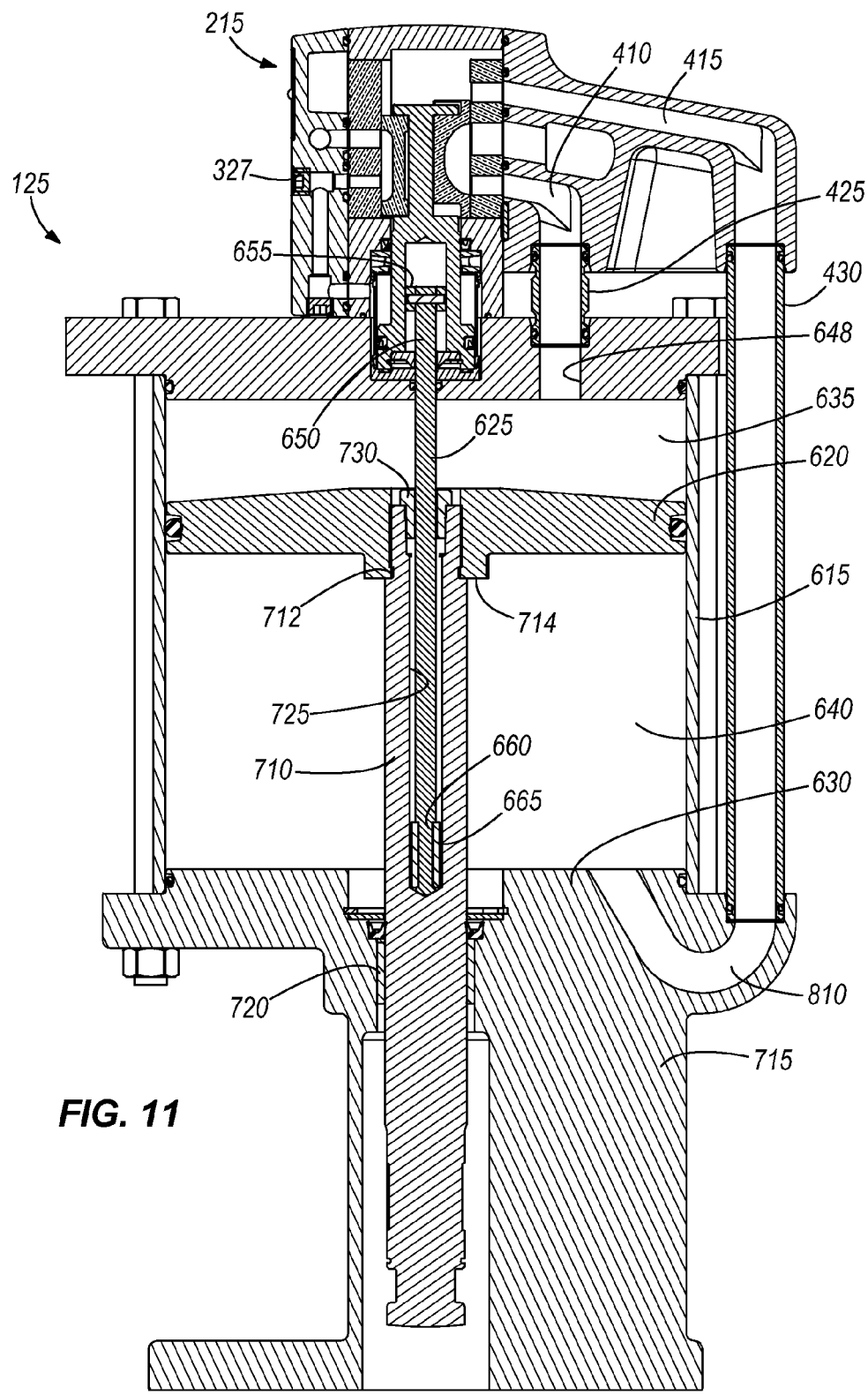
FIG. 11 is a cross-sectional view of the air motor in a second position in the operational cycle.

In FIG. 11, the piston 620 has risen sufficiently so that the second end 660 of the actuation rod 625 bottoms out in the bore 725 of the output shaft 710, and the continued upward movement of the piston 620 pushes the actuation rod 625 up. There is therefore lost motion between the piston 620 and output shaft 710 on the one hand, and the actuation rod 625 on the other hand during the portion of upward piston 620 movement between FIGS. 10 and 11.

Figure 12:
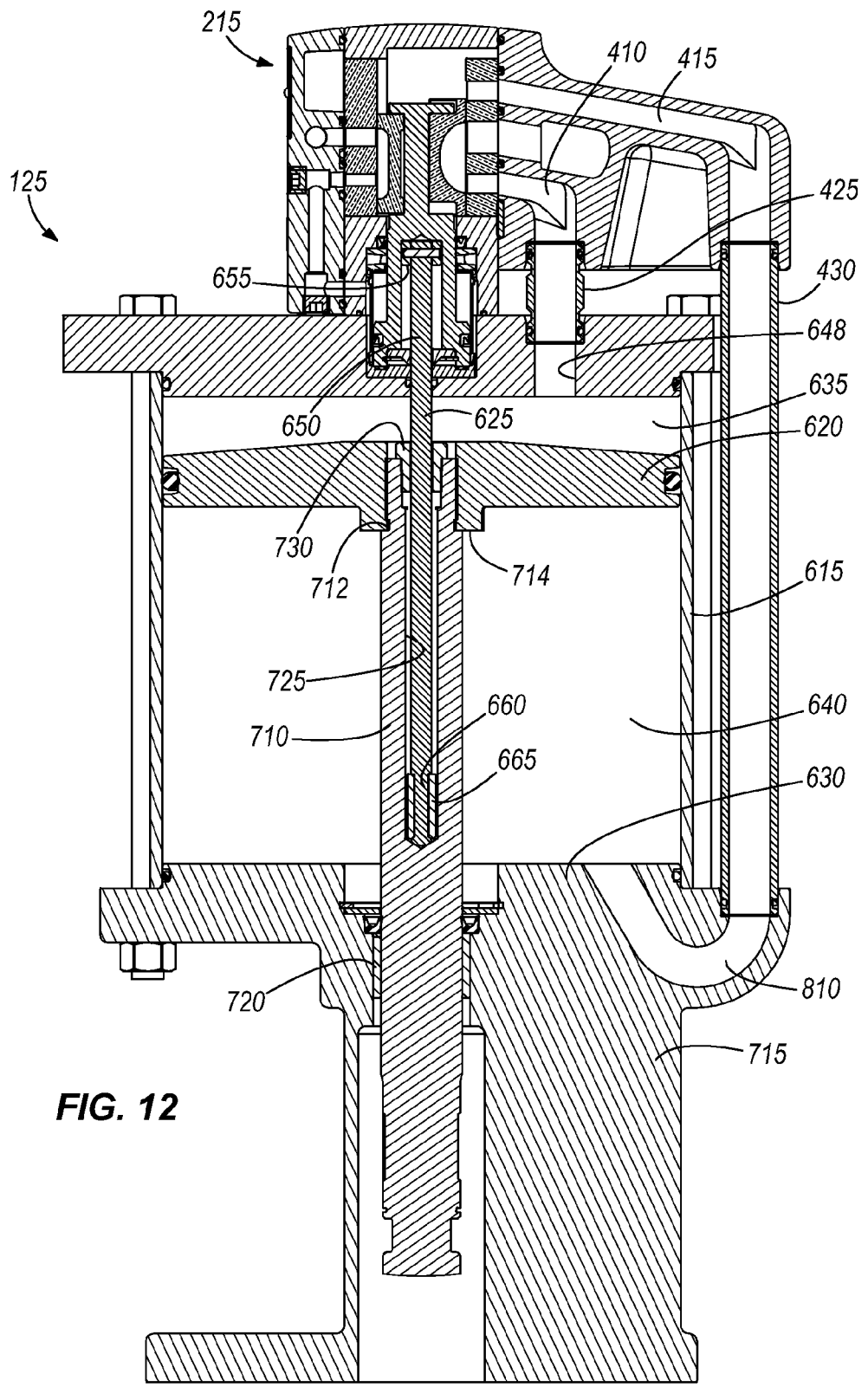
FIG. 12 is a cross-sectional view of the air motor in a third position in the operational cycle.

In FIG. 12, the piston 620 has risen sufficiently to move the first end 650 of the actuation rod 625 into the topped out position with respect to the bore 490 in the spool valve 360, as discussed above with respect to FIG. 7. There is therefore further lost motion between the piston 620 and actuation rod 625 on the one hand, and the spool valve 360 on the other hand during the portion of upward piston 620 movement between FIGS. 11 and 12.

Figure 13:
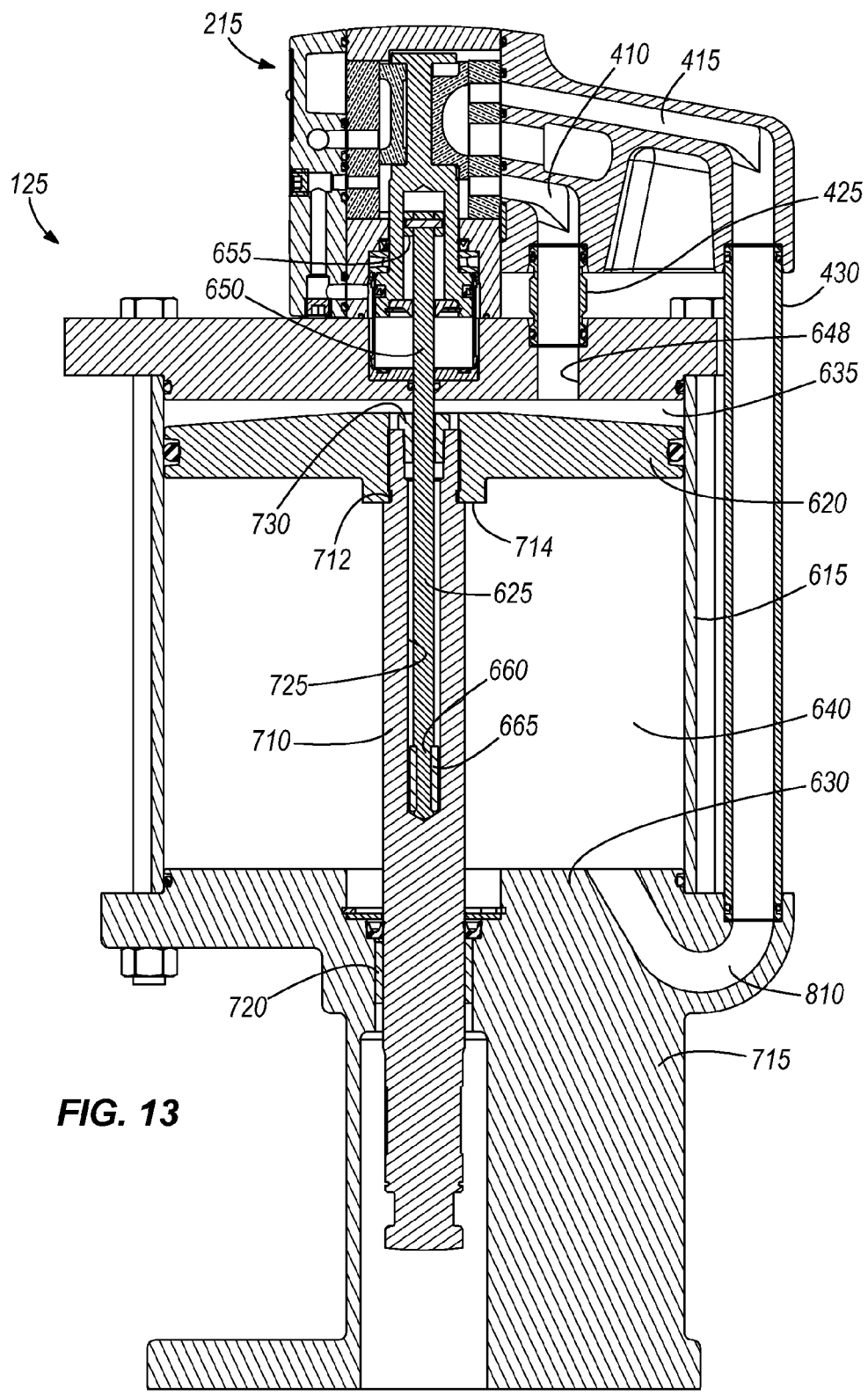
FIG. 13 is a cross-sectional view of the air motor in a fourth position in the operational cycle.

In FIG. 13, the spool valve 360 is in the full-up position as illustrated and described in FIG. 8. The top 650 of the actuation rod 625 is in between the top and bottom of the bore 490 in the spool valve 360.

Figure 14:
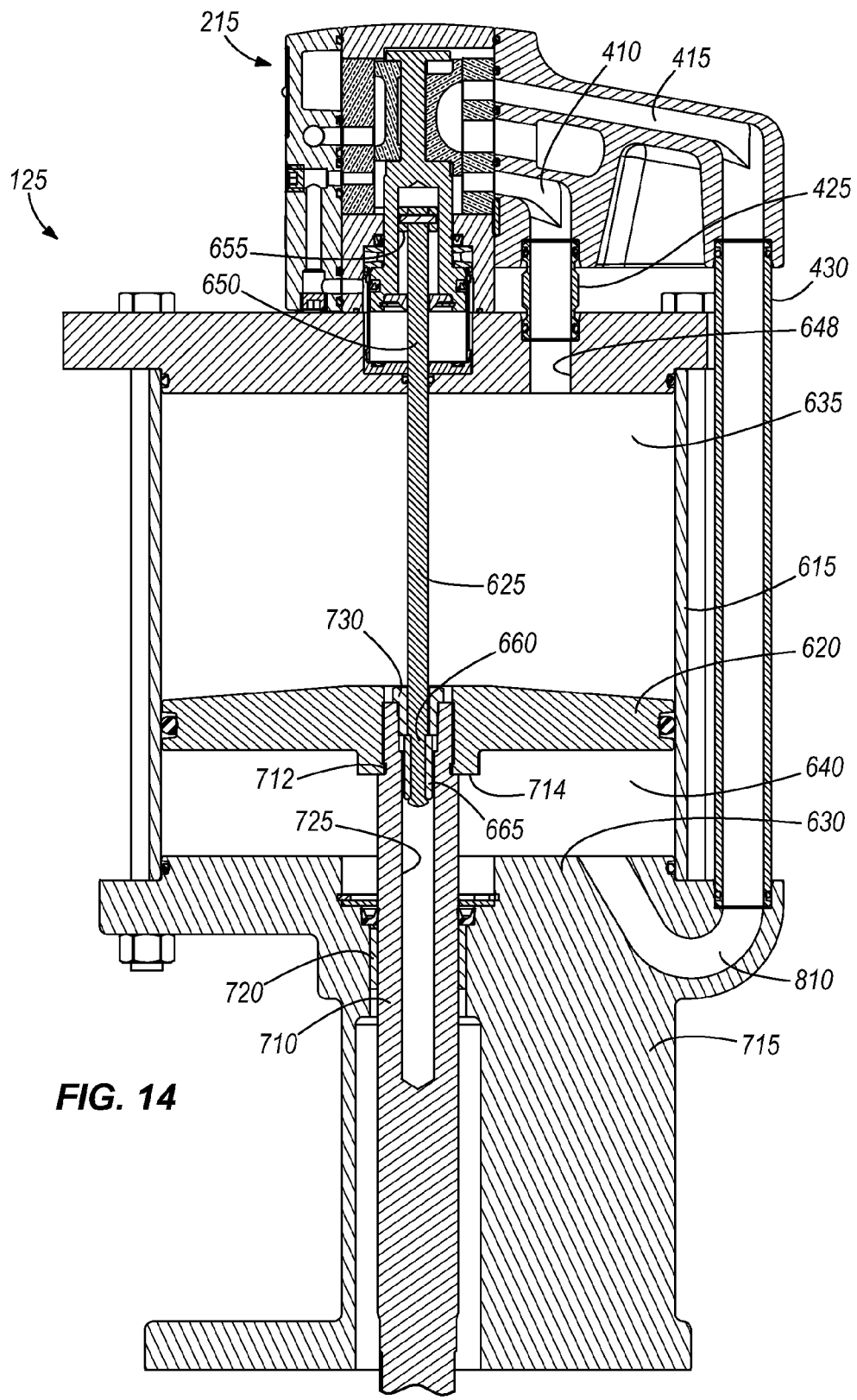
FIG. 14 is a cross-sectional view of the air motor in a fifth position in the operational cycle.

In FIG. 14, the valves 370, 380 are in the positions illustrated in FIG. 8, such that the piston 620 has started moving down. At the point illustrated in FIG. 14, the second end 660 of the actuation rod 625 has just topped out in the bore 725 of the output shaft 710, against the bushing 730. Further downward movement of the piston 620 from this position will pull the actuation rod 625 down with the piston 620 and output shaft 710. There is therefore further lost motion between the piston 620 and output shaft 710 on the one hand, and the actuation rod 625 on the other hand between FIGS. 13 and 14.

Figure 15:
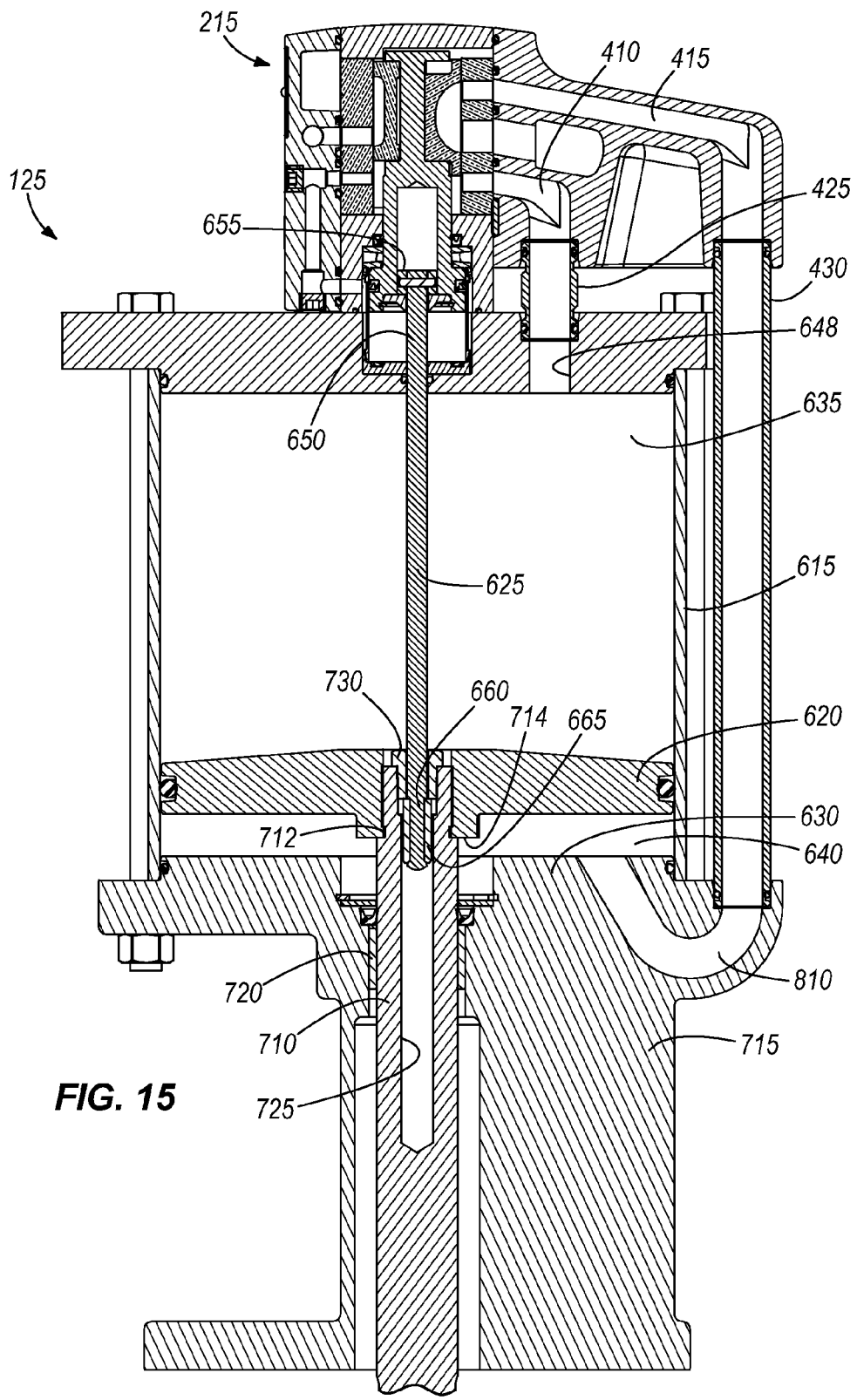
FIG. 15 is a cross-sectional view of the air motor in a sixth position in the operational cycle.

In FIG. 15, the first end 650 of the actuation rod 625 has just bottomed out in the bore 490 of the spool valve 360, with the cap 655 coming into contact with the washer 495. Further downward movement of the piston 620 from this position will pull the spool valve 360 down. There is therefore further lost motion between the piston 620 and actuation rod 625 on the one hand, and the spool valve 360 on the other hand between FIGS. 14 and 15. As the piston 620 moves down from the position shown in FIG. 15, the spool valve reaches the positions shown in FIG. 9 and then FIG. 6, which results in motive fluid being routed to the lower chamber 640 while the upper chamber 635 is vented to exhaust through the muffler 435. Once this happens, the piston 620, actuation rod 625, and spool valve 360 are in the position illustrated in FIG. 10, and the cycle is complete.

Figure 16:
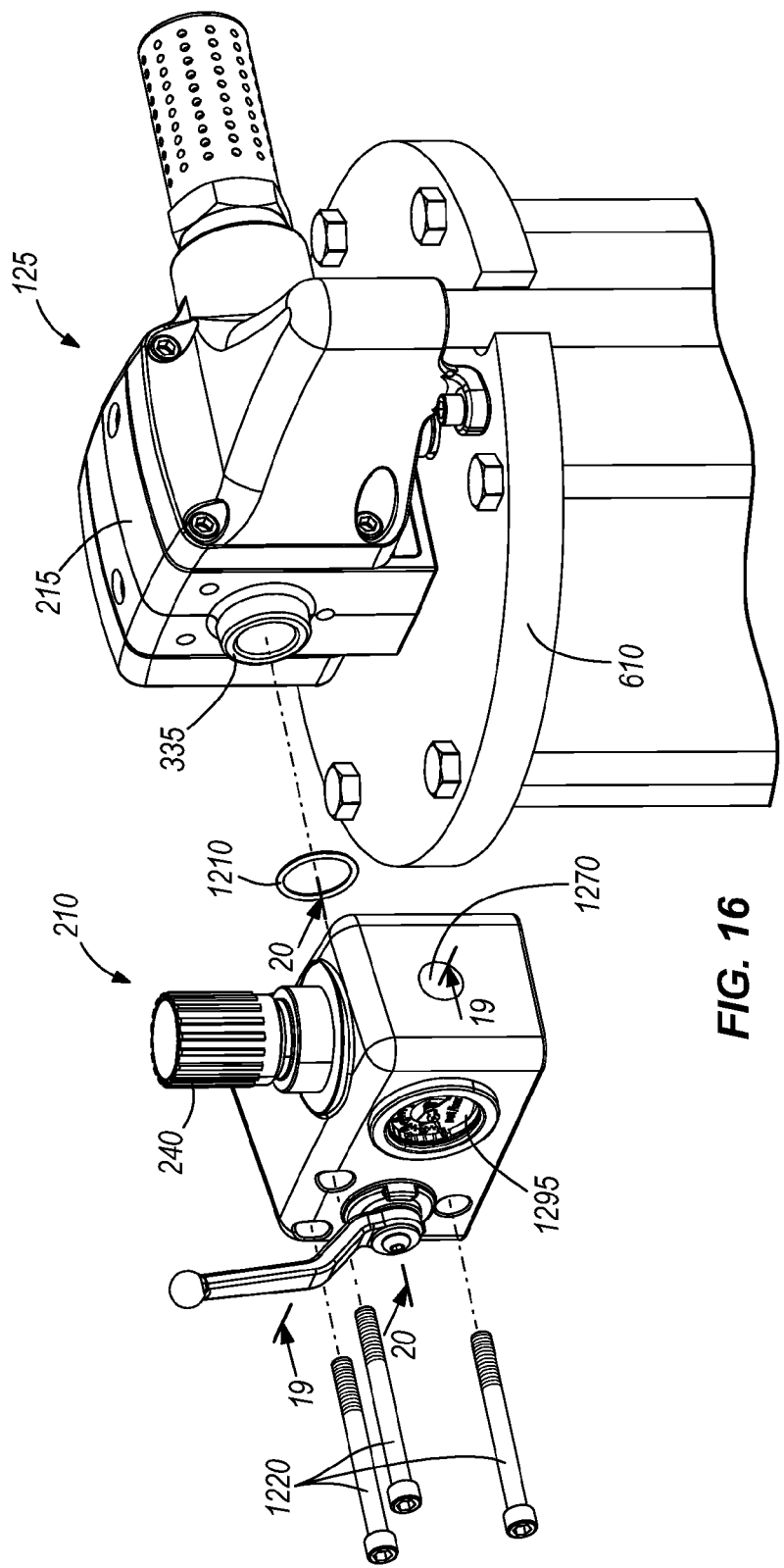
FIG. 16 is an exploded view of the top portion of the air motor, with the pressure regulator assembly separated from the valve block assembly.

FIG. 16 illustrates the pressure regulator assembly 210 exploded off of the valve block assembly 215 of the air motor 125. An O-ring 1210 is positioned between a pressure regulator outlet 1215 (FIG. 17) of the pressure regulator assembly 210 and the motive fluid inlet 335. The pressure regulator assembly 210 is removably coupled to the valve block assembly 215 by a plurality of fasteners 1220. The illustrated pressure regulator assembly 210 is a self-relieving ball valve type regulator and shut off. The valve is actuable by a user without the use of tools. The valve is a three-way, three-position valve.

Figure 17:
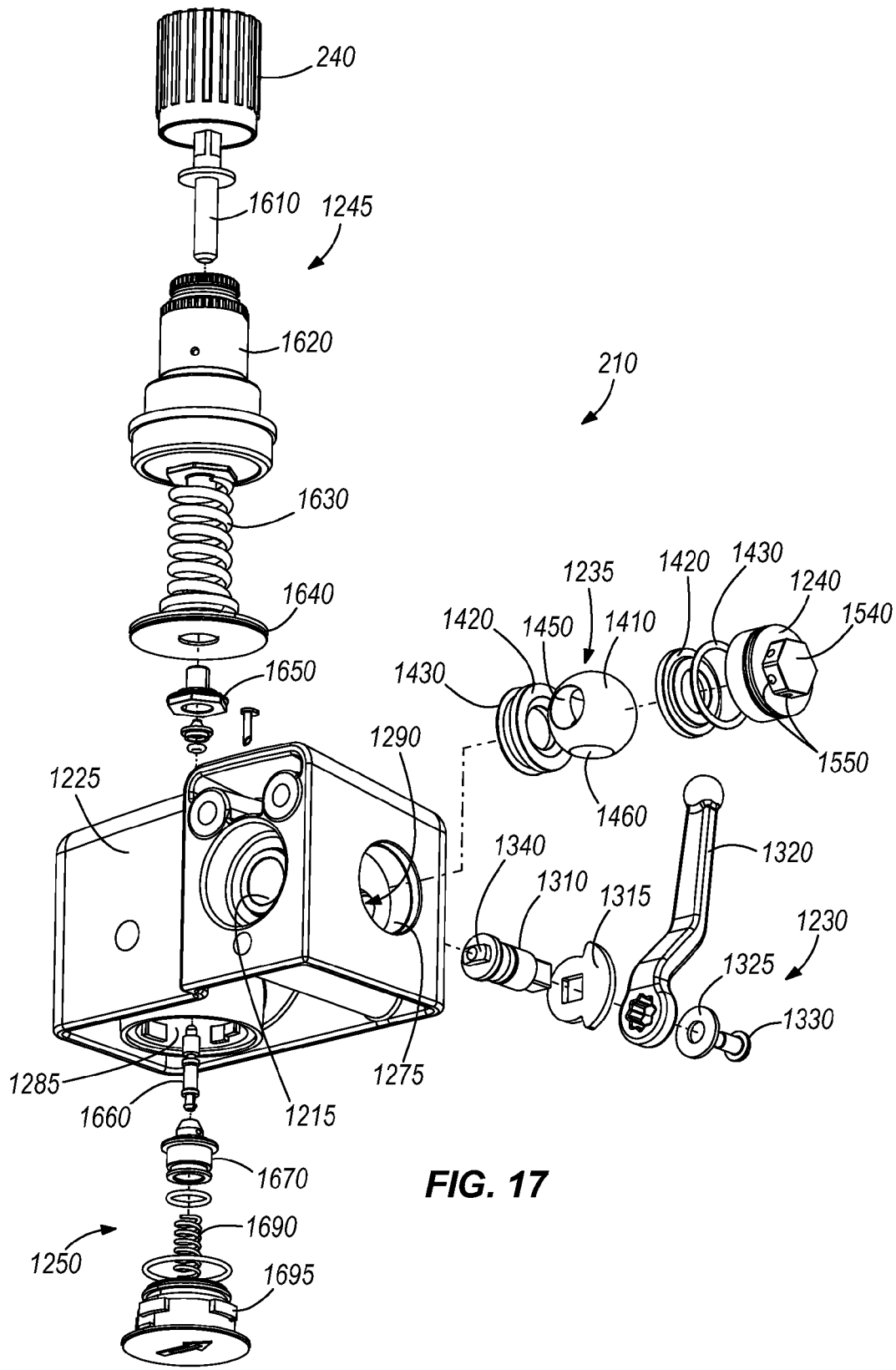
FIG. 17 is an exploded view of the pressure regulator assembly.

FIG. 17 illustrates the major components of the pressure regulator assembly 210, which include a housing 1225, an actuator assembly 1230, a ball valve assembly 1235, a bleed valve 1240, a first pressure adjustment assembly 1245, and a self-relieving valve assembly 1250. The housing 1225 includes a motive fluid inlet port 1270 (FIG. 16), the above-mentioned pressure regulator outlet 1215, a bleed valve port 1275, an actuator support 1280 (FIG. 20), a pressure adjustment chamber 1285, and a ball valve chamber 1290. The pressure regulator assembly 210 includes at least one gauge that displays at least one measurement parameter, such as pressure, temperature, volumetric flow rate, etc. The illustrated pressure regulator assembly 210 includes a pressure indicator 1295 (FIG. 16) provided in the housing 1225 so the operator can determine the pressure of motive fluid being supplied to the air motor 125.

Figure 18:
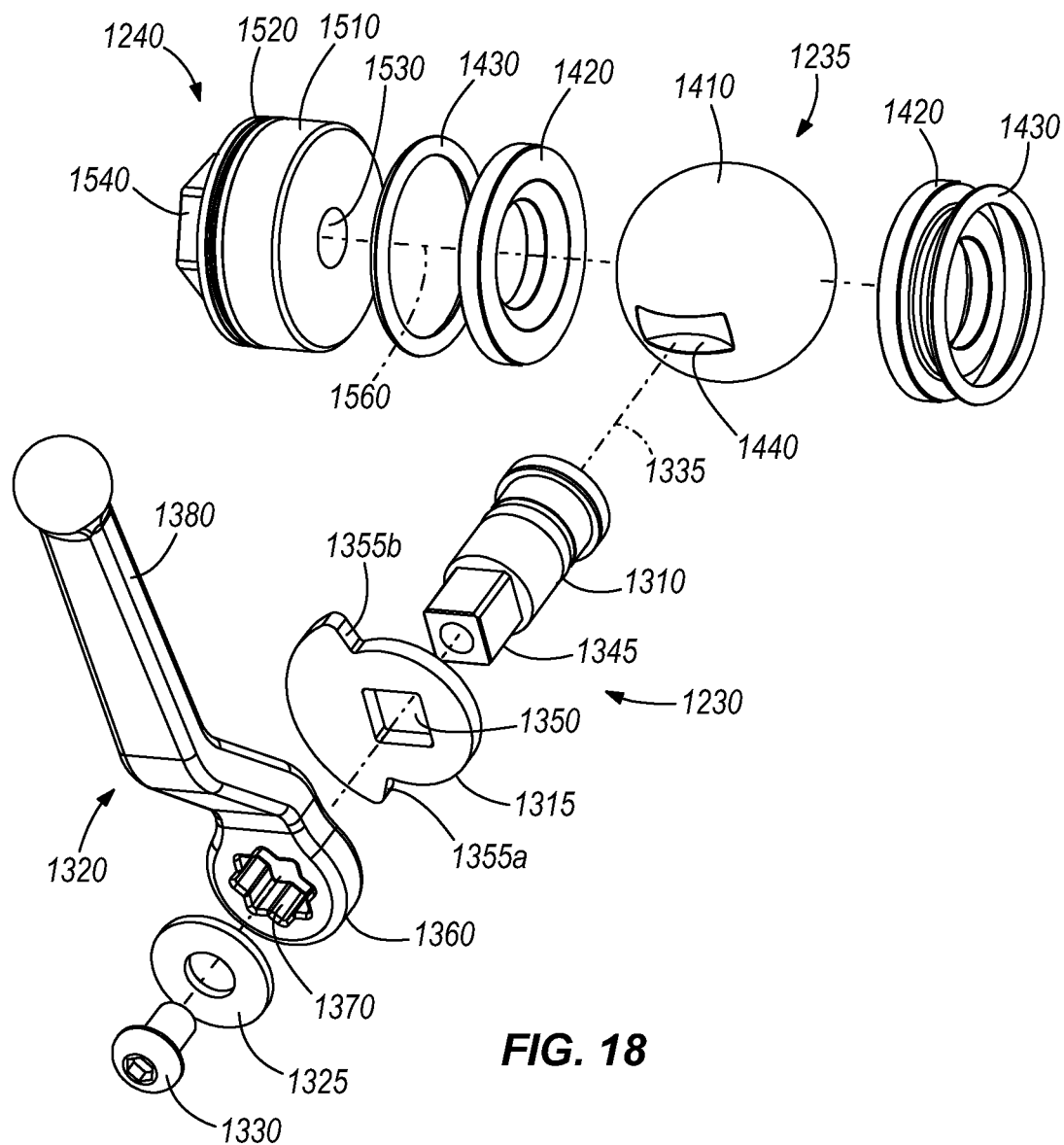
FIG. 18 is an exploded view of components of the pressure regulator assembly.

With additional reference to FIG. 18, the actuator assembly 1230 includes an actuator insert 1310, a hard stop 1315, a lever 1320, a washer 1325, and an actuator fastener 1330. The actuator insert 1310 is elongated and generally cylindrical, with a longitudinal axis 1335. The actuator insert 1310 includes a protrusion or key 1340 (FIG. 17) at one end and a square drive 1345 at an opposite end. The hard stop 1315 includes a square window 1350 and first and second stop shoulders 1355a, 1355b. The lever 1320 includes a hub 1360 having an internally toothed aperture 1370, and a handle 1380 extending away from the hub 1360 generally in a plane parallel to the hub 1360.

With continued reference to FIGS. 17 and 18, the ball valve assembly 1235 includes a ball 1410, a pair of seats 1420 made of brass or another wear resistant material, such as acetal, and a pair of seals 1430. The ball 1410 includes a slot or keyway 1440 that receives the protrusion or key 1340 of the actuator insert 1310. As seen in FIG. 17, the ball 1410 also includes a first aperture 1450 and a second aperture 1460 which communicate with each other and through sides of the ball 1410. The first and second apertures 1450, 1460 define an elbow or 90° conduit within the ball 1410.

The bleed valve 1240 includes a threaded cylindrical portion 1510, a seal 1520, a central bore 1530, and a hex head 1540 with vent ports 1550 (FIG. 17) that communicate with the central bore 1530 and through the flats on the hex head 1540. The central bore 1530 defines a central axis 1560. The hex head 1540 is engageable with a tool, such as a standard wrench, to install and remove the bleed valve 1240 from the bleed valve port 1275.

As assembled and installed, the actuator insert 1310 is received within the actuator support 1280 (FIG. 20) and supported there for rotation about the longitudinal axis 1335. The square window 1350 of the hard stop 1315 and the internally toothed aperture 1370 of the lever 1320 fit around the square drive 1345 of the actuator insert 1310, such that the lever 1320, hard stop 1315, and actuator insert 1310 are coupled for rotation together. The washer 1325 sits against an outwardly facing surface of the hub 1360 of the lever 1320, and the fastener 1330 threads into a threaded hole in the square drive 1345 end of the actuator insert 1310. The fastener 1330 and washer 1325 hold the lever 1320 on the actuator insert 1310.

The ball 1410 is received within the ball valve chamber 1290, with the key 1340 of the actuator insert 1310 received in the keyway 1440, such that the ball 1410 is coupled for rotation about the axis 1335 with the actuator assembly 1230. The seats 1420 and seals 1430 sit on opposite sides of the ball 1410 with the seats 1420 against the ball 1410. One of the seals 1430 sits against a wall of the ball valve chamber 1290. The other seal 1430 sits against the flat end of the cylindrical portion 1510 of the bleed valve 1240. The threaded portion 1510 of the bleed valve 1240 is threaded into the bleed valve port 1275. The seats 1420 and seals are ring-shaped and aligned along axis 1560, which is perpendicular to axis 1335. The seats 1420 support the ball for rotation about the axis 1335.

The first pressure adjustment assembly 1245 includes the pressure adjustment handle 240 described above, a push rod 1610, a main body 1620, a spring 1630, a washer/diaphragm 1640, and a seat 1650. The self-relieving valve assembly 1250 includes a needle 1660, a valve 1670, a spring 1690, and an end cap 1695. The main body 1620 and control handle 240 are mounted in an opening in the top of the housing 1225, and end cap 1695 is secured in an opening in the bottom of the housing 1225. The spring 1630 is between the top of the main body and the washer/diaphragm 1640. Upon rotation of the control handle 240, the control handle pushes the push rod 1610 down against the force of the spring 1630. On the lower side, the needle 1660 sits on top of the valve 1670. The spring 1690 is compressed between the valve 1670 and the end cap 1695, and biases the valve 1670 against a seat or rim 1710 in the housing 1225 to resist fluid flow past the valve 1670 and into the ball valve chamber 1290. Downward movement of the push rod 1610, under the influence of rotation of the control handle 240, eventually causes the push rod 1610 to push down on the needle 1660, which in turn causes the valve 1670 to unseat from the rim 1710 and open communication between the motive fluid inlet port 1270 and the ball valve chamber 1290. The degree to which the valve 1670 is unseated from the rim 1710 determines the pressure of motive fluid supplied to the ball valve chamber 1290 and ultimately to the rest of the air motor.

Figure 19:
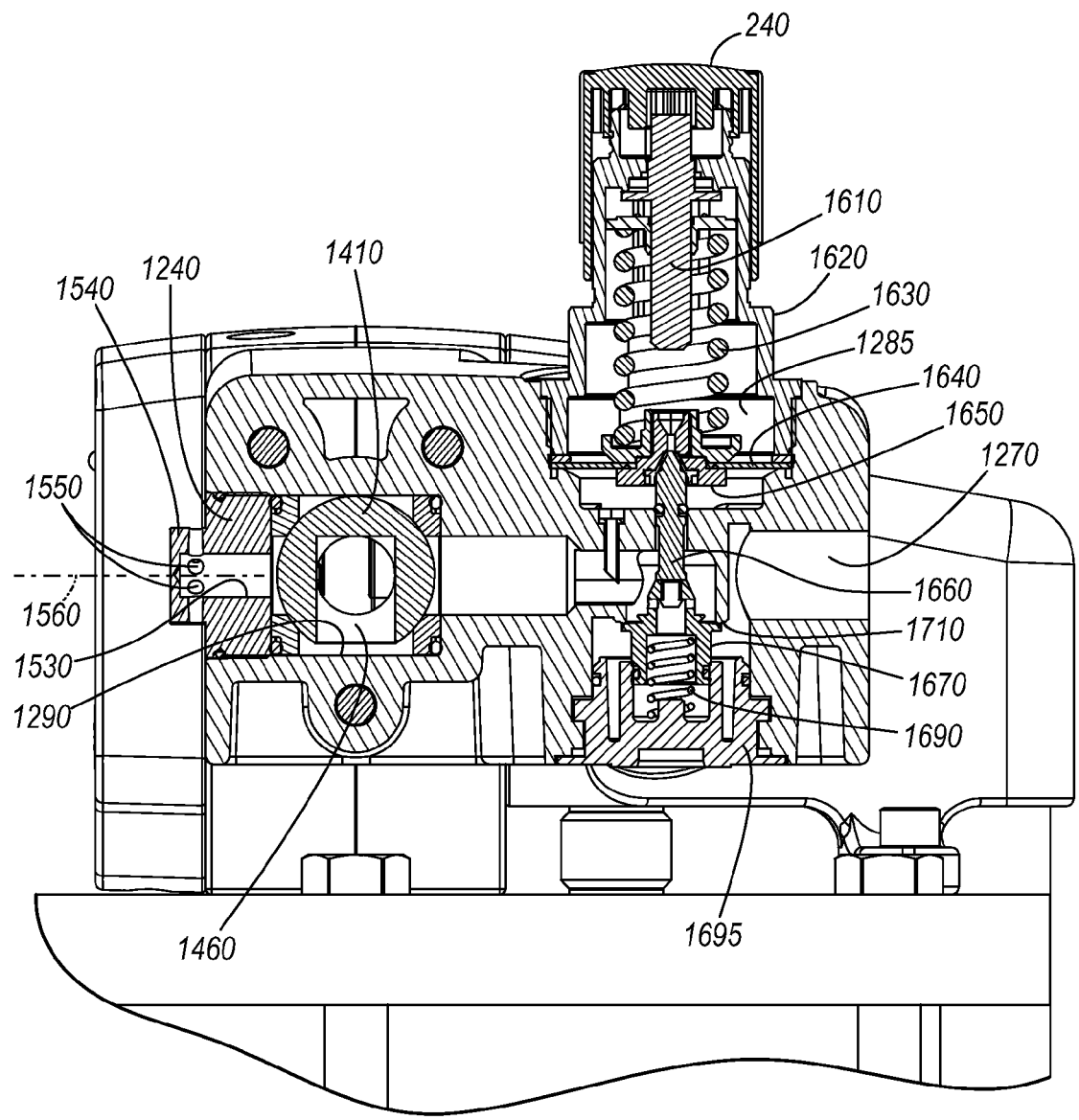
FIG. 19 is a cross-sectional view of the valve shut off taken along line 19-19 of FIG. 16.
Figure 20:
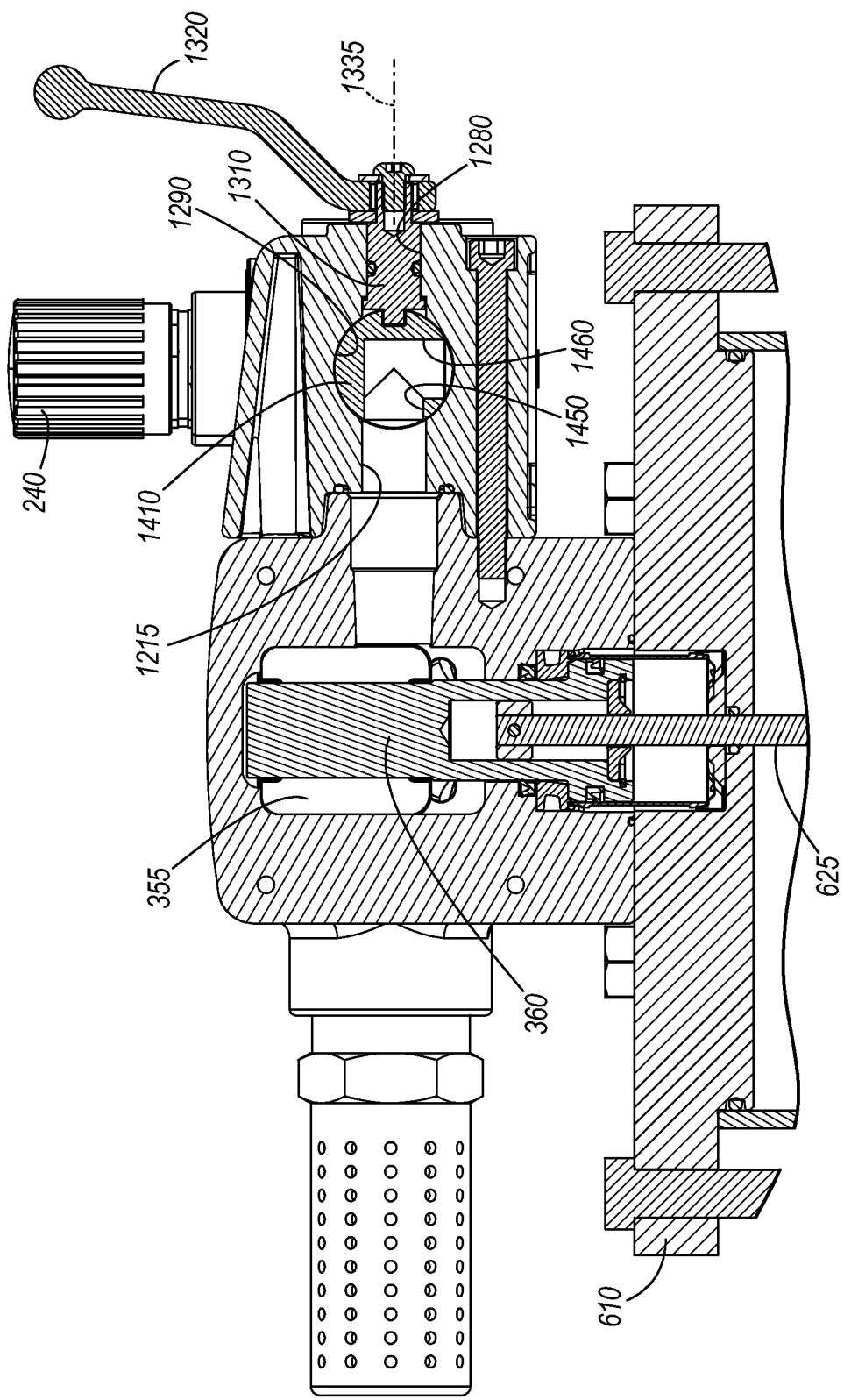
FIG. 20 is a cross-sectional view of the valve shut off taken along line 20-20 of FIG. 16.
Figure 21:
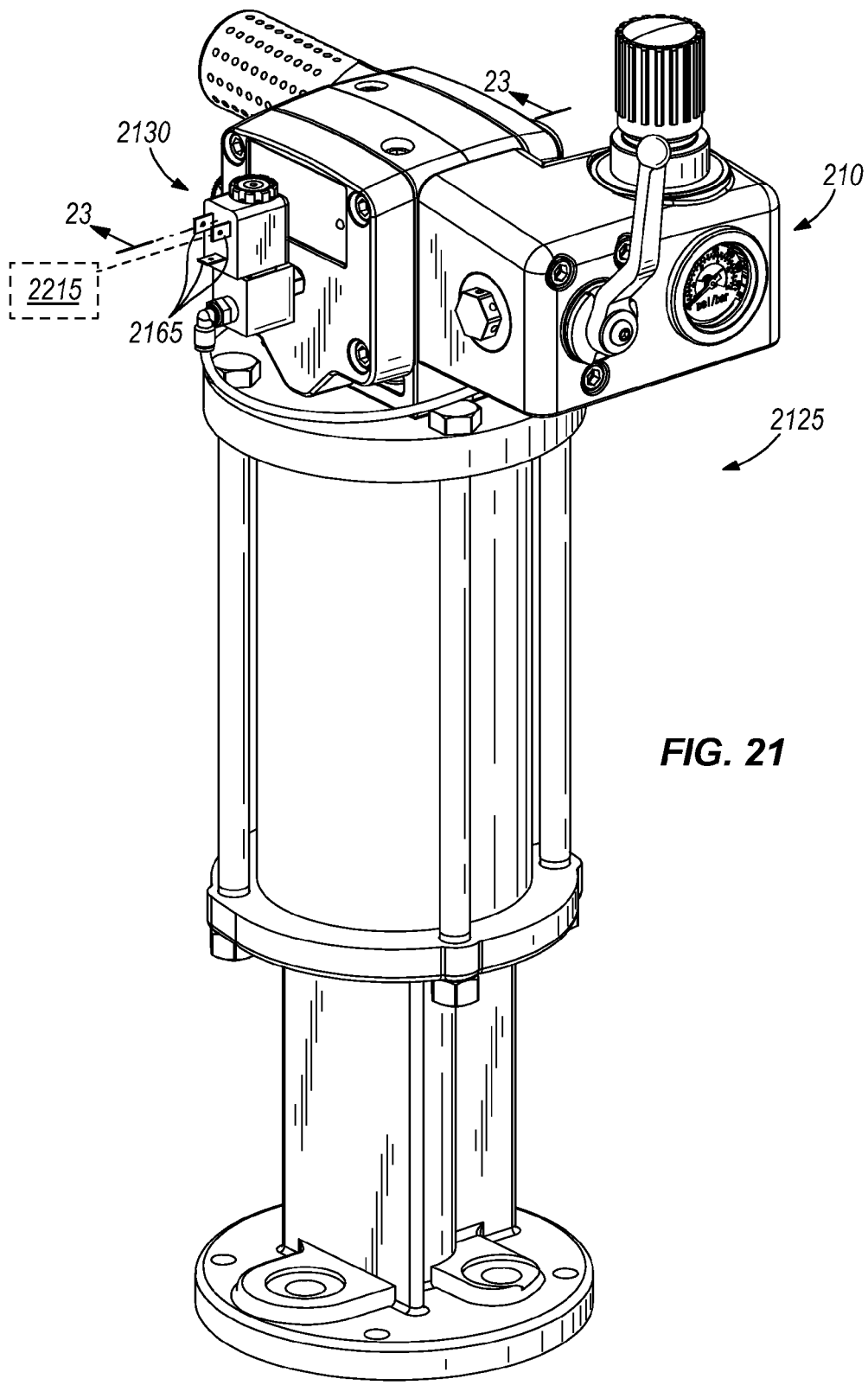
FIG. 21 is a perspective view of an air motor according to some embodiments of the present invention.

In operation, the ball 1410 is rotated about the axis 1335, under the influence of an operator pivoting the lever 1320, between an off position, an on position, and a bleed position. In all positions, the first aperture 1450 in the ball 1410 is aligned with and communicates with the pressure regulator outlet 1215 along axis 1335. As seen in FIGS. 19 and 20, positioning the ball 1410 in the off position faces the second aperture 1460 downwardly in the ball valve chamber 1290, which results in motive fluid from the motive fluid inlet 1270 being stopped before entering the ball valve chamber 1290. In this position, the second aperture 1460 opens in a direction perpendicular to both the axis 1335 and the axis 1560.

When the ball 1410 is rotated about axis 1335 to the on position, the first stop shoulder 1335*a* comes into contact with a stop on the housing 1225. In this position, the second aperture 1460 is aligned with the motive fluid inlet 1270, such that motive fluid is routed through the ball 1410 and into the air motor valve block assembly 215. The second aperture opens along axis 1560 in this position, toward the motive fluid inlet 1270.

When the ball 1410 is rotated to the bleed position, the second stop shoulder 1335*b* comes into contact with another stop or the same stop on the housing 1225. In this position, the second aperture 1460 is aligned with the bleed valve port 1275. In this position, motive fluid in the air motor 125 can flow out through the pressure regulator outlet 1215, the ball 1410, the bleed valve port 1275, the bore 1530 in the bleed valve 1240, and the vent ports 1550. The second aperture opens along axis 1560 in this position, toward the bleed valve port 1275. The bleed valve 1240 permits a user to manually de-pressurize the air motor 125 without requiring the user to disconnect the motor hose 160 from the air motor 125.

It is advantageous to combine the actuator assembly 1230, the ball valve assembly 1235, the bleed valve 1240, the first pressure adjustment assembly 1245, and the self-relieving valve assembly 1250 into a single housing 1225 to form a module, such as in the illustrated pressure regulator assembly 210. The modular pressure regulator assembly 210 can be bolted on to the air motor 125 as a single modular component, and can be removed from the air motor 125 as a single component. In embodiments that do not bolt the pressure regulator assembly 210 to the air motor 125, a pipe or conduit is connected directly to the motive fluid inlet 335. Such embodiments utilize a remote pressure regulator to regulate pressure and thus, throttle of the air motor 125. The pressure regulator assembly 210 is configured to be coupled directly to the motive fluid inlet 335, without requiring the use of a separate pipe or a quick coupler.

FIGS. 21-25 illustrate an air motor 2125 that is controlled electrically, instead of mechanically. The air motor 2125 can be a retrofit of the air motor 125 above, or can be manufactured as a new air motor. The illustrated air motor 2125 has many of the same components as the air motor 125, and like components will be given like numbers.

FIGS. 21-25 illustrate a solenoid valve 2130 coupled to the air motor 2125. The illustrated solenoid valve 2130 defines an inlet port 2135, an outlet port 2140, a vent port 2145, a plunger 2150, a spring 2155, a coil winding 2160, and an electrical connector 2165. Although a solenoid valve 2130 is illustrated, other valves or valve configurations can be utilized.

The inlet port 2135 is fluidly coupled to the motive fluid supply 145 (see FIG. 1) either directly or through the modular relief valve assembly 210. A tube fitting, such as the illustrated push lock fitting 2170, is connectable to the inlet port 2135 to facilitate fluid connection between the motive fluid supply 145 and the solenoid valve 2130.

The outlet port 2140 is fluidly coupled to the air motor 2125. A tube connector 2175 is connectable to the outlet port 2140 to facilitate fluid connection between the solenoid valve 2130 and the air motor 2125. The illustrated tube connector 2175 is inserted into the pilot port 328, but other connections and configurations are possible.

The illustrated vent port 2145 includes a first portion 2180 and a second portion 2185. The first portion 2180 of the vent port 2145 is defined in the valve housing and fluidly coupled to the outlet port 2140, and the second portion 2185 of the vent port 2145 extends through the plunger 2150 and is vented to atmosphere.

The plunger 2150 includes a first end 2190, a second end 2195, an elongate portion extending between the first end 2190 and the second end 2195, a seal 2205 and a cap 2210. The first end 2190 has an increased diameter and supports the seal 2205. The second end 2195 supports the cap 2210.

The plunger 2150 is moveable between a first position and a second position. The illustrated first position is a closed position shown in FIG. 22, and the illustrated second position is an open position shown in FIG. 23. When the plunger 2150 is in the closed position, the first end 2190 substantially seals off the inlet port 2135 from the outlet port 2140, and permits the outlet port 2140 to vent to atmosphere through the vent port 2145. When the plunger 2150 is in the open position, the inlet port 2135 is fluidly coupled to the outlet port 2140, and the vent port 2145 is substantially fluidly sealed off from the inlet port 2135 and the outlet port 2140 by the seal 2205.

The illustrated spring 2155 encircles a portion of the plunger 2150 and engages at least one flange on the plunger 2150. In embodiments that utilize a normally-closed solenoid valve 2130, the spring 2155 biases the plunger 2150 toward the closed position (see FIG. 22).

The coil winding 2160 encircles a portion of the plunger 2150. In embodiments that utilize a normally-closed solenoid valve 2130, the coil winding 2160, when actuated, moves the plunger 2150 against the bias of the spring 2155 and toward the open position (see FIG. 23). Other valve opening and closing configurations can be utilized and the illustrated configuration is given by way of example only.

The electrical connector 2165 is electrically connected to the coil winding 2160. The electrical connector 2165 is configured for connection to a programmable logic controller 2215 (see FIG. 21). The programmable logic controller 2215 selectively actuates the coil winding 2160 to move the plunger 2150 between the closed position and the open position.

The air motor 125 includes the pipe plug 327 in the pilot port 328 (see FIGS. 3 and 5). The air motor 2125 either omits or removes the pipe plug 327 from the pilot cover 325 to expose the pilot port 328. The tube connector 2175 is inserted into the pilot port 328 to fluidly couple the valve 2130 to the air motor 2125.

In order to retrofit the air motor 125 into the air motor 2125, an operator removes the pilot cover 325, and either plugs the first and second pilot ports 470 and 475, or removes and replaces the pilot valve plate 385 with a solid plate 2220. This closes off air flow from the two-way pilot conduit 440 out of the pilot exhaust conduit 445. The pilot valve 380 becomes substantially non-functional and can be removed, or can remain present within the air motor 125. In the case of a new construction air motor 2125, a solid plate 2220 is utilized and the pilot valve 380 is omitted. The actuation rod 625 can also be removed for a retro-fit of air motor 125, or can be omitted for a new construction air motor 2125.

Figure 24:
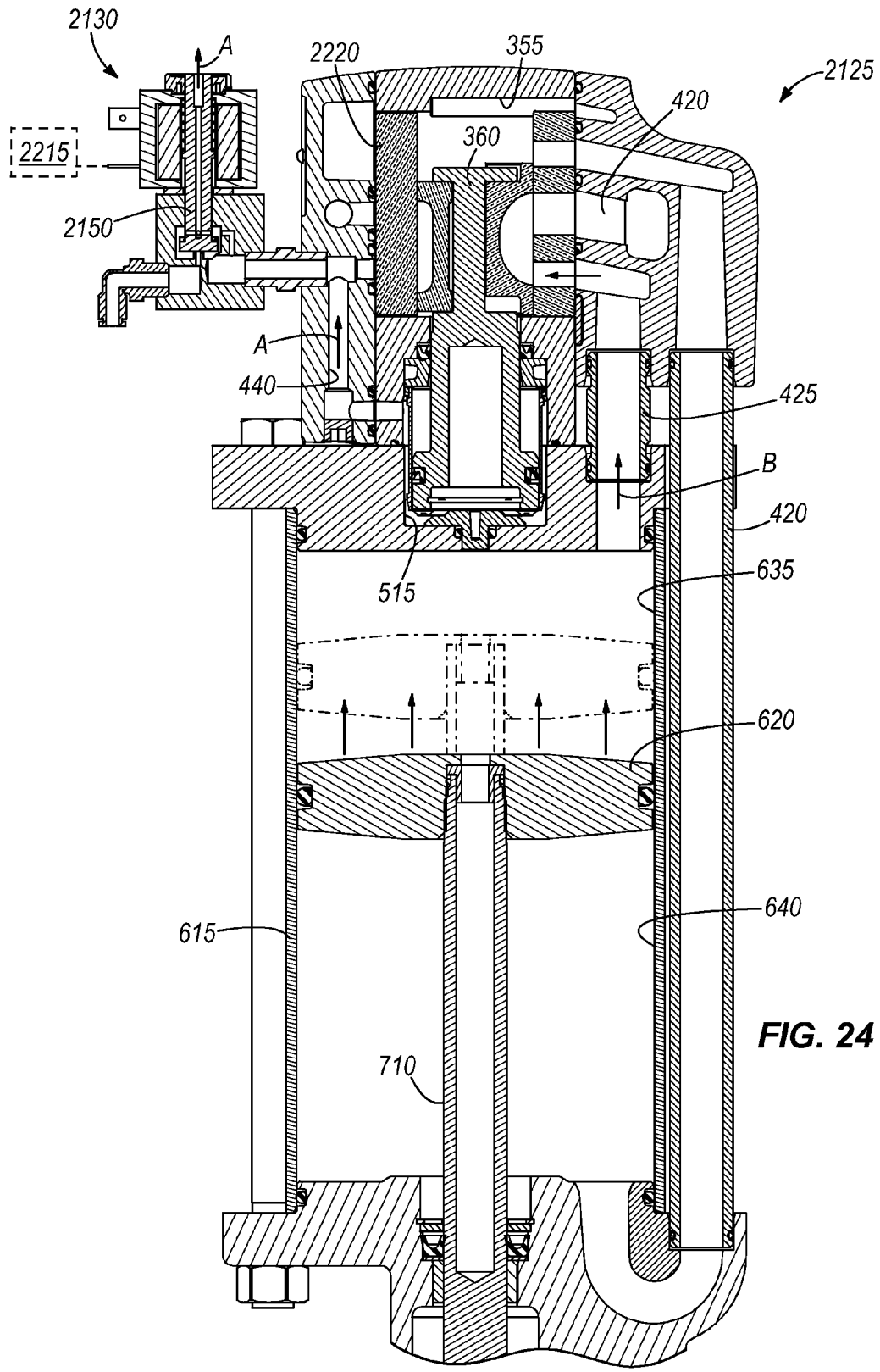
FIG. 24 is a cross-sectional view of the air motor with the valve in the first position, illustrating one stage of the operation of the air motor and taken along line 23-23 of FIG. 21.
Figure 25:
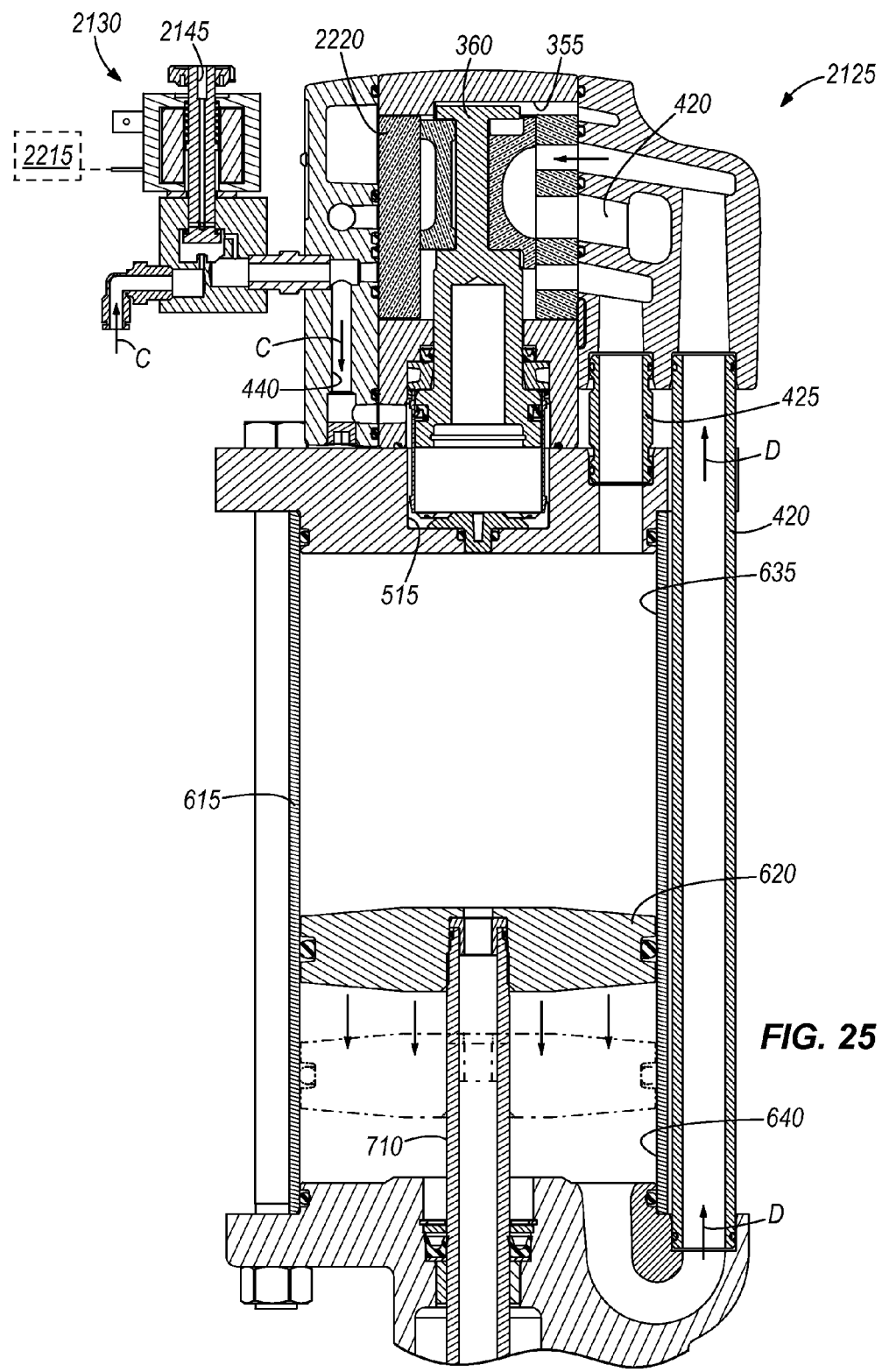
FIG. 25 is a cross-sectional view of the air motor with the valve in the second position, illustrating one stage of the operation of the air motor and taken along line 23-23 of FIG. 21.

The operation of the air motor 2125 is controlled by the valve 2130 and the programmable logic controller 2215. FIGS. 24 and 25 illustrate two steps of operation of the air motor 2125.

Figure 22:
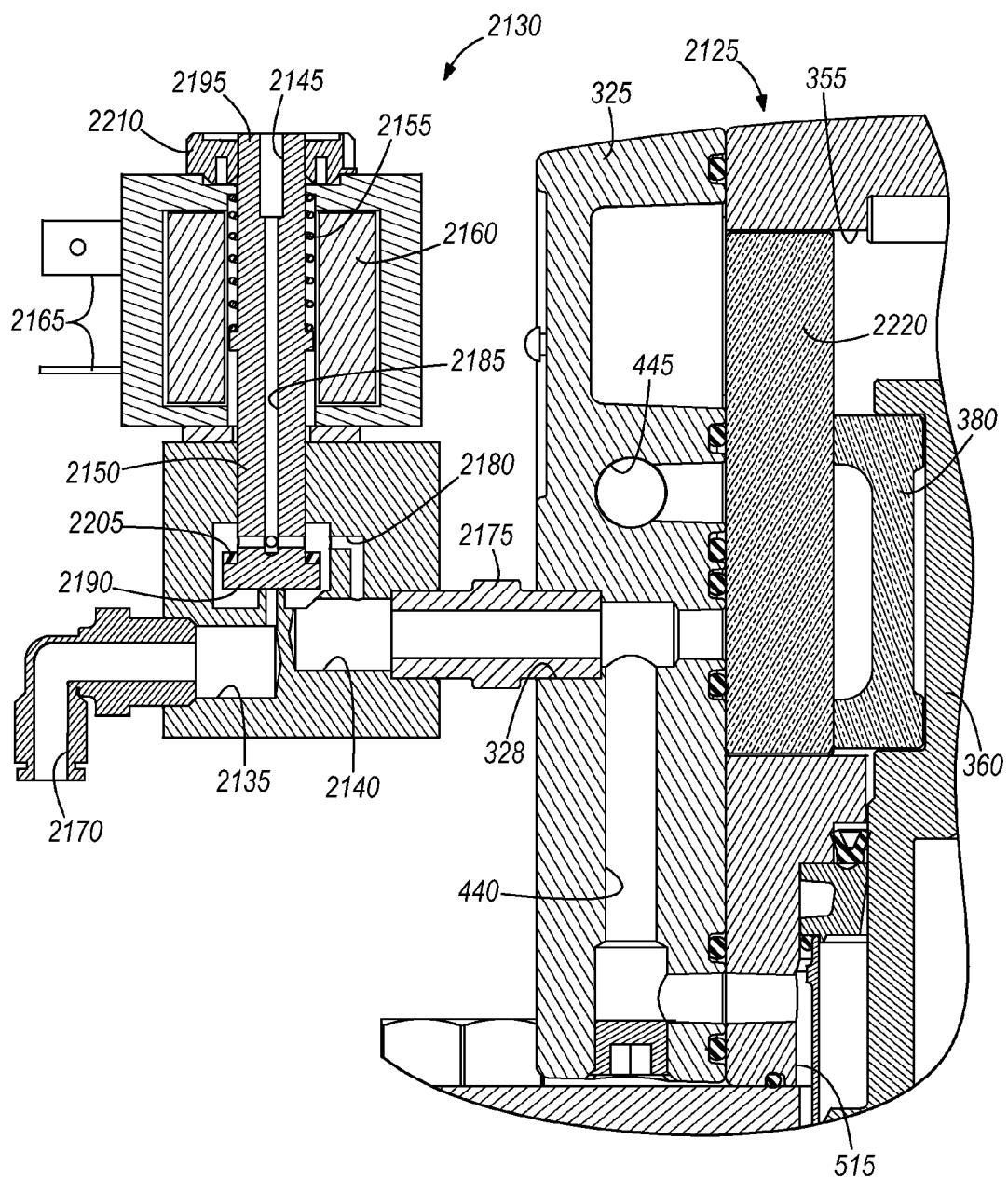
FIG. 22 is a cross-sectional view of the air motor having a valve in a first position and taken along line 23-23 of FIG. 21.

As shown in FIGS. 22 and 24, when the plunger 2150 is in the closed position, flow from the motive fluid supply 145 (see FIG. 1) is inhibited from entering the pilot chamber 515 of the air motor 2125, and motive fluid in the pilot chamber 515 is permitted to vent through the two-way pilot conduit 440 and the vent port 2145 to atmosphere, as shown by arrows A. This permits the pressure in the pilot chamber 515 to drop to substantially atmospheric pressure. As described for the air motor 125, the valve chamber 355 of the air motor 2125 is maintained substantially at operating pressure, which is greater than atmospheric pressure. The difference in pressure above and below the spool valve 360 causes the spool valve 360 to lower. When the spool valve 360 is in the lower position (shown in FIG. 24) the upper chamber 635 is fluidly connected to the exhaust port 420 as shown by arrow B. The lower chamber 640 is fluidly connected to the valve chamber 355, and is thus at operation pressure, which thereby causes the piston 620 to rise in the cylinder 615.

Figure 23:
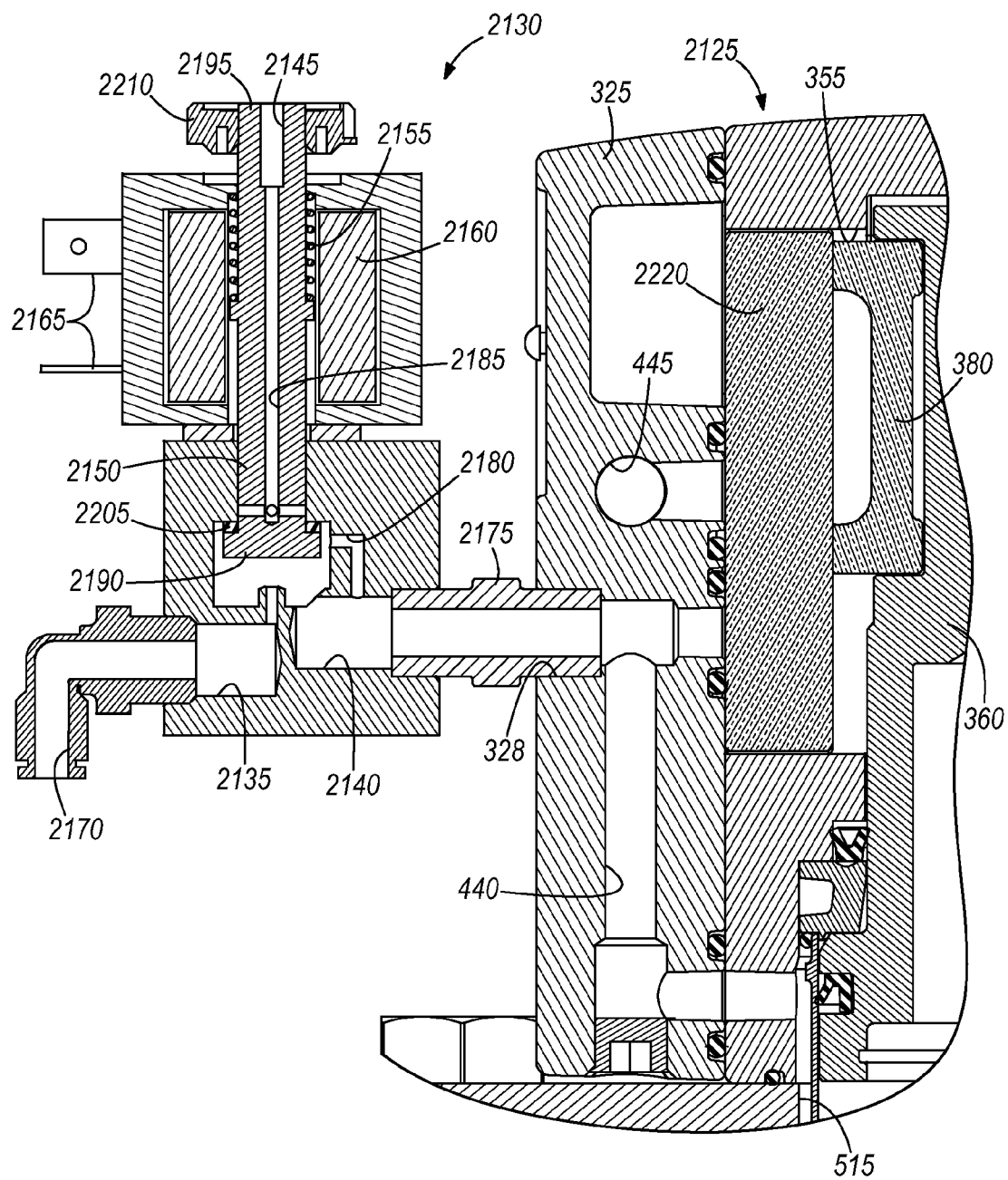
FIG. 23 is a cross-sectional view of the air motor with the valve in a second position and taken along line 23-23 of FIG. 21.

As shown in FIGS. 23 and 25, when the plunger 2150 is in the open position, flow from the motive fluid supply 145 is directed through the valve 2130 and into the pilot chamber 515 of the air motor 2125, as shown by arrows C, and motive fluid from the pilot chamber 515 is inhibited from venting through the vent port 2145 to atmosphere. This raises the pressure in the pilot chamber 515 to operating pressure. As described for the air motor 125, the valve chamber 355 of the air motor 2125 is maintained substantially at operating pressure. The top of the spool valve 360 has a smaller surface area than the bottom of the spool valve 360. Because the top and bottom are exposed to the same pressure, the resultant force on the bottom of the spool valve 360 is greater than the resultant force on the top of the spool valve 360. Consequently, the spool valve 360 moves up under the influence of the force difference. The lower chamber 640 is fluidly connected to the exhaust port 420, which permits the fluid in lower chamber 640 to exhaust to atmosphere, as shown by arrows D. The upper chamber 635 is fluidly connected to the valve chamber 355, and is thus at operating pressure, which thereby lowers the piston 620 in the cylinder 615.

The movement of the piston 620 in the cylinder 615 and the operation of the air motor 2125, are controlled by the valve 2130 and the programmable logic controller 2215 instead of the mechanical control of the air motor 125.

Thus, the invention provides, among other things, an electric control for an air motor. Various features and advantages of the invention are set forth in the following claims.

What is claimed is:
1. An air motor comprising:
a motive fluid inlet adapted to receive a flow of motive fluid;
a motor cylinder;
a piston within the motor cylinder, the piston dividing the motor cylinder into an upper chamber above the piston and a lower chamber below the piston;
a valve chamber including a pilot chamber portion;
a spool valve shiftable between a first position in response to motive fluid pressurizing the pilot chamber portion and a second position in response to the pilot chamber portion being at atmospheric pressure, the spool valve including a reduced diameter section and an enlarged diameter section, the enlarged diameter section being exposed to the pilot chamber portion;
a D-valve plate including a first D-valve port communicating with the upper chamber, a second D-valve port communicating with the lower chamber, and a D-valve exhaust port communicating with atmosphere;
a D-valve having a flat surface surrounding a concave surface, the flat surface being in sliding contact with the D-valve plate and the concave surface facing the D-valve plate, the D-valve being coupled via a lost motion interconnection to the reduced diameter section of the spool valve, the D-valve being shiftable with the spool valve between first and second positions corresponding to the respective first and second positions of the spool valve, wherein the D-valve uncovers the first D-valve port when the D-valve is in the first position to introduce motive fluid into the upper chamber, the concave surface of the D-valve placing the second D-valve port in communication with the D-valve exhaust port to place the lower chamber in communication with the atmosphere when the D-valve is in the first position, wherein the D-valve uncovers the second D-valve port when the D-valve is in the second position to introduce motive fluid into the lower chamber, the concave surface of the D-valve placing the first D-valve port in communication with the D-valve exhaust port to place the upper chamber in communication with the atmosphere when the D-valve is in the second position;
a pilot port fluidly coupled to the pilot chamber portion by a two-way pilot conduit;
a valve coupled to the pilot port, the valve shiftable between a first position, in which a flow of motive fluid is directed into the pilot port, through the two-way pilot conduit and into the pilot chamber portion, and a second position, in which the flow of motive fluid is inhibited from flowing into the pilot port through the two-way pilot conduit and into the pilot chamber portion and in which fluid in the pilot chamber portion flows out through the two way pilot conduit and is directed by the valve to exhaust, wherein the valve is connectable to a programmable logic controller, such that the valve is actuable between the first position and the second position in response to the programmable logic controller; and an output rod interconnected for reciprocal movement with the piston and adapted to perform work.

2. The air motor of claim 1, further comprising a modular relief valve assembly adapted to be coupled to the motive fluid inlet, the modular relief valve assembly having an assembly housing containing an actuator assembly, a ball valve assembly, a bleed valve, a first pressure adjustment assembly, and a self-relieving valve assembly, wherein the assembly housing includes a motive fluid inlet port, a pressure regulator outlet, a bleed valve port, an actuator support, a pressure adjustment chamber, and a ball valve chamber, and wherein the modular relief valve assembly includes at least one gauge that displays at least one measurement parameter.

3. The air motor of claim 1, wherein when the valve is a solenoid valve having an inlet port operable to receive the flow of motive fluid, an outlet port fluidly coupled to the pilot port, and a vent port.

4. The air motor of claim 3, wherein the inlet port is fluidly coupled to the outlet port when the valve is in the first position, and wherein the inlet port is fluidly coupled to the vent port when the valve is in the second position.

5. A method of retrofitting a mechanically-actuated air motor, the method comprising:
    removing a pilot cover from a valve housing of an air motor, the air motor having:
        a motive fluid inlet adapted to receive a flow of motive fluid;
        a motor cylinder;
        a piston within the motor cylinder, the piston dividing the motor cylinder into an upper chamber above the piston and a lower chamber below the piston;
        a valve chamber including a pilot chamber portion;
        a spool valve shiftable between first and second positions, the spool valve including a reduced diameter section and an enlarged diameter section, the enlarged diameter section being exposed to the pilot chamber portion;
        a D-valve plate including a first D-valve port communicating with the upper chamber, a second D-valve port communicating with the lower chamber, and a D-valve exhaust port communicating with atmosphere; and
        a D-valve having a flat surface surrounding a concave surface, the flat surface being in sliding contact with the D-valve plate and the concave surface facing the D-valve plate, the D-valve being coupled via a lost motion interconnection to the reduced diameter section of the spool valve, the D-valve being shiftable with the spool valve between first and second positions corresponding to the respective first and second positions of the spool valve, wherein the D-valve uncovers the first D-valve port when the D-valve is in the first position to introduce motive fluid into the upper chamber, the concave surface of the D-valve placing the second D-valve port in communication with the D-valve exhaust port to place the lower chamber in communication with the atmosphere when the D-valve is in the first position, wherein the D-valve uncovers the second D-valve port when the D-valve is in the second position to introduce motive fluid into the lower chamber, the concave surface of the D-valve placing the first D-valve port in communication with the D-valve exhaust port-to place the upper chamber in communication with the atmosphere when the D-valve is in the second position;
    removing a pilot valve plate having a first pilot port communicating with the pilot chamber portion and a second pilot port communicating with atmosphere;
    blocking an opening between a third pilot port on the valve housing and a pilot exhaust conduit;
    re-connecting the pilot cover to the valve housing;
    removing a pipe plug from the third pilot port;
    inserting a conduit into the third pilot port;
    coupling a valve to the conduit;
    fluidly connecting the valve to a source of motive fluid; and
    controlling reciprocation of the piston with the valve.

6. The method of claim 5, wherein blocking an opening between the third pilot port and a pilot exhaust conduit includes inserting a solid plate into the valve housing.

7. The method of claim 5, wherein controlling reciprocation of the piston with the valve includes fluidly coupling an inlet port to the source of motive fluid, and selectively fluidly coupling an outlet port to the inlet port and to a vent port.

8. The method of claim 7, wherein the controlling reciprocation of the piston further includes reciprocating the valve between a first position and a second position wherein the inlet port is fluidly coupled to the outlet port when the valve is in the first position, and wherein the inlet port is fluidly coupled to the vent port when the valve is in the second position.

9. A pump assembly comprising:
    a motive fluid inlet adapted to receive a flow of motive fluid;
    a motor cylinder;
    a piston within the motor cylinder, the piston dividing the motor cylinder into an upper chamber above the piston and a lower chamber below the piston;
    a valve chamber including a pilot chamber portion;
    a spool valve shiftable between first and second positions, the spool valve including a reduced diameter section and an enlarged diameter section, the enlarged diameter section being exposed to the pilot chamber portion;
    a D-valve plate including a first D-valve port communicating with the upper chamber, a second D-valve port communicating with the lower chamber, and a D-valve exhaust port communicating with atmosphere;
    a D-valve having a flat surface surrounding a concave surface, the flat surface being in sliding contact with the D-valve plate and the concave surface facing the D-valve plate, the D-valve being coupled via a lost motion interconnection to the reduced diameter section of the spool valve, the D-valve being shiftable with the spool valve between first and second positions corresponding to the respective first and second positions of the spool valve, wherein the D-valve uncovers the first D-valve port when the D-valve is in the first position to introduce motive fluid into the upper chamber, the concave surface of the D-valve placing the second D-valve port in communication with the D-valve exhaust port to place the lower chamber in communication with the atmosphere when the D-valve is in the first position, wherein the D-valve uncovers the second D-valve port when the D-valve is in the second position to introduce motive fluid into the lower chamber, the concave surface of the D-valve placing the first D-valve port in communication with the D-valve exhaust port to place the upper chamber in communication with the atmosphere when the D-valve is in the second position;
    a pilot port fluidly coupled to the pilot chamber portion by a two-way pilot conduit;

a valve coupled to the pilot port, the valve shiftable between a first position, in which a flow of motive fluid is directed into the pilot port through the two-way pilot conduit and into the pilot chamber portion, and a second position, in which the flow of motive fluid is inhibited from flowing into the pilot port through the two-way pilot conduit and into the pilot chamber portion and in which fluid in the pilot chamber portion flows out through the two way pilot conduit and is directed by the valve to exhaust, wherein the valve is connectable to a programmable logic controller, such that the valve is actuable between the first position and the second position in response to the programmable logic controller;

an output rod interconnected for reciprocal movement with the piston; and a piston pump including a pump cylinder, an outlet, and a one-way valve supported for reciprocation within the pump cylinder and operable to move fluid from below the one-way valve toward the outlet, the one-way valve being interconnected with the output rod to cause reciprocation of the one-way valve to move a fluid to be pumped from within the pump cylinder out the outlet to a desired destination.

10. The pump of claim 9, further comprising a modular relief valve assembly adapted to be coupled to the motive fluid inlet, the modular relief valve assembly having an assembly housing containing an actuator assembly, a ball valve assembly, a bleed valve, a first pressure adjustment assembly, and a self-relieving valve assembly, wherein the assembly housing includes a motive fluid inlet port, a pressure regulator outlet, a bleed valve port, an actuator support, a pressure adjustment chamber, and a ball valve chamber, and wherein the modular relief valve assembly includes at least one gauge that displays at least one measurement parameter.

11. The pump of claim 9, wherein when the valve is a solenoid valve having an inlet port operable to receive the flow of motive fluid, an outlet port fluidly coupled to the pilot port, and a vent port.

12. The pump of claim 11, wherein the inlet port is fluidly coupled to the outlet port when the valve is in the first position, and wherein the inlet port is fluidly coupled to the vent port when the valve is in the second position.

13. An assembly comprising:

a motor cylinder including a piston that divides the motor cylinder into an upper chamber above the piston and a lower chamber below the piston;

a valve chamber including a pilot chamber portion;

a spool valve shiftable between a first position in response to motive fluid pressurizing the pilot chamber portion and a second position in response to the pilot chamber portion being at atmospheric pressure, the spool valve including a reduced diameter section and an enlarged diameter section, the enlarged diameter section being exposed to the pilot chamber portion;

a pilot port fluidly coupled to the pilot chamber portion by a two-way pilot conduit;

a valve coupled to the pilot port and connectable to a programmable logic controller such that the valve is actuable between a first position and a second position in response to the programmable logic controller, wherein the valve is configured to direct motive fluid along a first flow path through the pilot port and the two-way pilot conduit and into the pilot chamber portion when the valve is in the first position, and wherein the valve is configured to (i) inhibit the motive fluid from flowing along the first flow path and (ii) direct the motive fluid from the pilot chamber portion through the two-way pilot conduit and the pilot port and out a vent port when the valve is in the second position; and a D-valve plate including a first D-valve port communicating with the upper chamber, a second D-valve port communicating with the lower chamber, and a D-valve exhaust port communicating with atmosphere; and a D-valve being in sliding contact with the D-valve plate and coupled to the reduced diameter section of the spool valve.

14. The assembly of claim 13, wherein the D-valve comprises a flat surface surrounding a concave surface, the flat surface being in sliding contact with the D-valve plate and the concave surface facing the D-valve plate, the D-valve being coupled via a lost motion interconnection to the reduced diameter section of the spool valve, the D-valve being shiftable with the spool valve between first and second positions corresponding to the respective first and second positions of the spool valve, wherein the D-valve uncovers the first D-valve port when the D-valve is in the first position to introduce motive fluid into the upper chamber, the concave surface of the D-valve placing the second D-valve port in communication with the D-valve exhaust port to place the lower chamber in communication with the atmosphere when the D-valve is in the first position, wherein the D-valve uncovers the second D-valve port when the D-valve is in the second position to introduce motive fluid into the lower chamber, the concave surface of the D-valve placing the first D-valve port in communication with the D-valve exhaust port to place the upper chamber in communication with the atmosphere when the D-valve is in the second position.

15. The assembly of claim 13, wherein the valve comprises a solenoid valve electrically controlled by the programmable logic controller to move between the first and second positions.

16. The assembly of claim 15, wherein the solenoid valve is maintained closed in the second position until a signal is received from the programmable logic controller to open the solenoid valve to the first position.

17. The assembly of claim 13, further comprising an output rod interconnected for reciprocal movement with the piston.

18. The assembly of claim 17, further comprising a piston pump including a pump cylinder, an outlet, and a one-way valve supported for reciprocation within the pump cylinder and operable to move fluid from below the one-way valve toward the outlet, the one-way valve being interconnected with the output rod to cause reciprocation of the one-way valve to move a fluid to be pumped from within the pump cylinder out the outlet.

\* \* \* \* \*